(12) United States Patent
Belloni et al.

(10) Patent No.: US 12,522,978 B2
(45) Date of Patent: Jan. 13, 2026

(54) PROCESS FOR THE PREPARATION OF A MICROFIBROUS SUEDE-LIKE NONWOVEN FABRIC

(71) Applicant: ALCANTARA S.P.A., Milan (IT)

(72) Inventors: Giovanni Belloni, Terni (IT); Carmine Carlo Ammirati, Lodi (IT); Giovanni Addino, Terni (IT); Walter Cardinali, Marsciano (IT); Andrea Bellucci, Amelia (IT); Francesco Panetti, Spoleto (IT); Roberto Puoti, Terni (IT); David Zoppitelli, Terni (IT); Elena Patrucco, Terni (IT); Giovanni Palomba, Terni (IT); Mirco Rossi, Acquasparta (IT); Valentina Bianchi, Amelia (IT); Francesco Casciotta, Terni (IT); Massimo Angeletti, Terni (IT); Roberto Marri, Configni (IT); Sergio Pecorari, Terni (IT)

(73) Assignee: ALCANTARA S.P.A., Milan (IT)

( * ) Notice: Subject to any disclaimer, the term of this patent is extended or adjusted under 35 U.S.C. 154(b) by 1190 days.

(21) Appl. No.: 16/633,885

(22) PCT Filed: Jul. 31, 2018

(86) PCT No.: PCT/IB2018/055720
§ 371 (c)(1),
(2) Date: Jan. 24, 2020

(87) PCT Pub. No.: WO2019/025964
PCT Pub. Date: Feb. 7, 2019

(65) Prior Publication Data
US 2020/0240076 A1     Jul. 30, 2020

(30) Foreign Application Priority Data

Aug. 2, 2017 (IT) .................. 102017000089038

(51) Int. Cl.
*D06N 3/00* (2006.01)
*D01D 5/36* (2006.01)
(Continued)

(52) U.S. Cl.
CPC ......... *D06N 3/0004* (2013.01); *D06N 3/0081* (2013.01); *D06N 3/14* (2013.01);
(Continued)

(58) Field of Classification Search
CPC ...... D06N 3/0004; D06N 3/0081; D06N 3/14; D06N 2207/123; D06N 2209/105;
(Continued)

(56) References Cited

U.S. PATENT DOCUMENTS

| 4,390,566 A | 6/1983 | Umezawa et al. |
|---|---|---|
| 2015/0233050 A1 | 8/2015 | Koide et al. |
| 2015/0275421 A1* | 10/2015 | Cardinali ............ D06N 3/0004 427/561 |

FOREIGN PATENT DOCUMENTS

| EP | 1243691 A1 | 9/2002 |
|---|---|---|
| EP | 1353006 A1 | 10/2003 |

(Continued)

OTHER PUBLICATIONS

Office Action in Corresponding Indian Patent Application No. 20202700583, mailed Feb. 24, 2022.

*Primary Examiner* — S. Behrooz Ghorishi
(74) *Attorney, Agent, or Firm* — Silvia Salvadori, P.C.; Silvia Salvadori

(57) ABSTRACT

The present invention relates to a process for preparing a microfibrous non-woven synthetic suede-like fabric, which does not require the use of organic solvents and which enables a soft finished product to be obtained that is provided with a good hand, that is elastic and with excellent resistance to yellowing and high durability.

10 Claims, 6 Drawing Sheets

(51) Int. Cl.
- *D01D 10/06* (2006.01)
- *D01F 8/04* (2006.01)
- *D02G 3/36* (2006.01)
- *D04H 1/488* (2012.01)
- *D04H 1/65* (2012.01)
- *D04H 3/105* (2012.01)
- *D06M 10/00* (2006.01)
- *D06M 11/38* (2006.01)
- *D06M 13/144* (2006.01)
- *D06M 15/333* (2006.01)
- *D06M 15/564* (2006.01)
- *D06M 23/10* (2006.01)
- *D06N 3/14* (2006.01)

(52) U.S. Cl.
CPC ............... *D01D 5/36* (2013.01); *D01D 10/06* (2013.01); *D01F 8/04* (2013.01); *D02G 3/36* (2013.01); *D04H 1/488* (2013.01); *D04H 1/65* (2013.01); *D04H 3/105* (2013.01); *D06M 10/001* (2013.01); *D06M 10/003* (2013.01); *D06M 10/006* (2013.01); *D06M 11/38* (2013.01); *D06M 13/144* (2013.01); *D06M 15/333* (2013.01); *D06M 15/564* (2013.01); *D06M 23/10* (2013.01); *D06N 2207/123* (2013.01); *D06N 2209/105* (2013.01); *D06N 2211/28* (2013.01)

(58) Field of Classification Search
CPC .... D06N 2211/28; D06N 3/0036; D01D 5/36; D01D 10/06; D01F 8/04; D02G 3/36; D04H 1/488; D04H 1/65; D04H 3/105; D06M 10/001; D06M 10/003; D06M 10/006; D06M 11/38; D06M 13/144; D06M 15/333; D06M 15/564; D06M 23/10

See application file for complete search history.

(56) References Cited

FOREIGN PATENT DOCUMENTS

| | | | |
|---|---|---|---|
| EP | 2927368 | A1 | 11/2013 |
| EP | 3112530 | A1 | 2/2015 |
| EP | 3202975 | A1 | 9/2015 |
| JP | 2002249988 | A | 9/2002 |
| JP | 2002294572 | A | 10/2002 |
| JP | 2004019081 | A * | 1/2004 |
| WO | 2014/087271 | A1 | 6/2014 |
| WO | 2016/052189 | A1 | 4/2016 |

* cited by examiner

FIG. 6

Table 2

FIG.7

| PROTO-TYPE | HAND-Softness | HAND-Gum-up | Appearance | Surface Touch | MARTINDALE ABRASION | | | | | | | | UV Ageing | | DURABILITY — Jungle Test | | | | | |
|---|---|---|---|---|---|---|---|---|---|---|---|---|---|---|---|---|---|---|---|---|
| | | | | | 2.000 cycle | | 5.000 cycle | | 10.000 cycle | | 20.000 cycle | | | | 5 Weeks | | 7 Weeks | | 10 Weeks | |
| | | | | | Pilling | Nap cutting | Pilling | Nap cutting | Pilling | Nap cutting | Pilling | Nap cutting | Pilling | Nap cutting | Pilling | Nap cutting | Pilling | Nap cutting | Pilling | Nap cutting |
| A | 5 | 5 | 5 | 5 | 4,5 | 4,5 | 4,5 | 4,5 | 4,5 | 4,5 | 4,5 | 4,5 | 4,5 | 4,5 | 4,5 | 4,5 | 4,5 | 4,5 | 4,5 | 4,5 |
| B | 3 | 2 | 2 | 4 | 3 | 3,5 | 3 | 3,5 | 3 | 4 | 3,5 | 4 | 3,5 | 3 | 3,5 | 3 | 3,5 | 3 | 3,5 | 3 |
| C | 3 | 3 | 3 | 4 | 4 | 4 | 4 | 4 | 4 | 4 | 4 | 4 | 4 | 4 | 4 | 4 | 4 | 4 | 4 | 4 |
| IE01 | 3 | 4 | 4 | 3 | 4 | 4,5 | 4 | 4,5 | 4 | 4 | 4,5 | 4 | 4,5 | 3 | 4,5 | 3,5 | 4 | 3,5 | 3,5 | 3,5 |
| IE02 | 3 | 2 | 4 | 4 | 4 | 4,5 | 4 | 4,5 | 4 | 4,5 | 4 | 4 | 4 | 4 | 4 | 4 | 4 | 4 | 4 | 4 |
| IE03 | 4 | 1 | 2 | 3 | 3,5 | 4 | 3,5 | 4 | 3,5 | 4,5 | 4 | 3,5 | 3,5 | 3 | 3,5 | 4 | 3,5 | 4 | 3,5 | 4 |
| IE04 | 5 | 4 | 5 | 5 | 4,5 | 4 | 4,5 | 4 | 4,5 | 4 | 4,5 | 4 | 4,5 | 4 | 4,5 | 4 | 4,5 | 3,5 | 4,5 | 4 |
| IE05 | 3 | 4 | 4 | 2 | 4 | 4 | 4 | 4 | 4 | 3,5 | 4,5 | 3,5 | 4 | 4 | 4 | 4 | 4,5 | 3,5 | 3,5 | 3,5 |
| IE06 | 4 | 4 | 4 | 4 | 3,5 | 4 | 3,5 | 4 | 3,5 | 4 | 3,5 | 4 | 3,5 | 4 | 3,5 | 4 | 4 | 4 | 4 | 3,5 |
| IE07 | 4 | 3 | 4 | 4 | 4,5 | 4 | 4,5 | 4 | 4,5 | 3,5 | 4,5 | 3,5 | 4 | 3,5 | 4 | 3,5 | 4 | 3,5 | 4 | 3,5 |
| IE08 | 1 | 4 | 4 | 2 | 4,5 | 3 | 4,5 | 3 | 4,5 | 3 | 4,5 | 2 | 4 | 2 | 4,5 | 3 | 4,5 | 3 | 3,5 | 2 |
| IE09 | 3 | 4 | 5 | 5 | 4,5 | 4 | 4,5 | 4 | 4 | 4 | 4,5 | 3,5 | 4,5 | 3,5 | 4,5 | 3,5 | 4 | 3,5 | 3,5 | 3,5 |
| IE10 | 4 | 3 | 4 | 4 | 3,5 | 4,5 | 4 | 4 | 4 | 4 | 4 | 3,5 | 4,5 | 3,5 | 4,5 | 3,5 | 4 | 3,5 | 3,5 | 3,5 |
| IE11 | 2 | 5 | 4 | 5 | 4,5 | 4 | 4,5 | 4 | 4,5 | 4 | 4,5 | 4 | 4,5 | 4 | 4,5 | 3,5 | 4,5 | 3,5 | 4 | 3,5 |
| IE12 | 3 | 3 | 5 | 3 | 3,5 | 4 | 3,5 | 4 | 2 | 4 | 4,5 | 3,5 | 4 | 3,5 | 3,5 | 3,5 | 4 | 3,5 | 4 | 3,5 |
| IE13 | 3 | 3 | 5 | 3 | 3,5 | 3,5 | 4 | 4 | 4 | 3,5 | 4,5 | 4 | 4 | 4 | 4 | 4 | 4 | 4 | 4 | 3,5 |
| IE14 | 5 | 3 | 1 | 3 | 2 | 4 | 2 | 4 | 2 | 4 | 4 | 3,5 | 3,5 | 3,5 | 3,5 | 3,5 | 3,5 | 4 | 3,5 | 4 |
| IE15 | 4 | 4 | 5 | 4 | 4 | 4 | 4 | 3,5 | 4 | 3,5 | 4,5 | 4 | 4 | 4 | 4 | 3,5 | 4 | 3,5 | 4 | 3,5 |
| IE16 | 5 | 4 | 4 | 5 | 3,5 | 4 | 3,5 | 4 | 4 | 4,5 | 4 | 3,5 | 3,5 | 3,5 | 3,5 | 3,5 | 3,5 | 3,5 | 4 | 3,5 |
| IE17 | 4 | 4 | 3 | 4 | 3,5 | 4,5 | 4 | 4 | 4,5 | 4,5 | 4 | 4 | 4 | 4 | 4 | 4 | 4 | 4 | 3,5 | 4 |
| IE18 | 3 | 3 | 4 | 3 | 4 | 4,5 | 4 | 4 | 3,5 | 4,5 | 4 | 4 | 4 | 3,5 | 4 | 3,5 | 4 | 3 | 4 | 3 |
| IE19 | 5 | 5 | 5 | 5 | 4,5 | 4 | 4,5 | 4 | 4,5 | 4 | 4,5 | 3,5 | 4,5 | 3,5 | 4,5 | 4 | 4,5 | 3,5 | 4,5 | 3,5 |
| IE20 | 5 | 2 | 2 | 4 | 2 | 4 | 2 | 3,5 | 2 | 4,5 | 3,5 | 3,5 | 3,5 | 4 | 3,5 | 3,5 | 4 | 3,5 | 3,5 | 3 |
| IE21 | 4 | 4 | 4 | 5 | 4 | 4 | 4 | 4,5 | 4,5 | 4 | 4 | 3,5 | 4,5 | 3,5 | 4,5 | 4 | 4,5 | 4 | 4 | 3,5 |
| IE22 | 4 | 2 | 4 | 4 | 3 | 4 | 3 | 4 | 3 | 4,5 | 4,5 | 3,5 | 4,5 | 3 | 4,5 | 3 | 4,4 | 3,5 | 3,5 | 3 |
| IE23 | 5 | 4 | 4 | 5 | 3,5 | 4,5 | 3,5 | 4,5 | 3,5 | 4,5 | 4 | 3,5 | 4 | 3,5 | 4 | 3,5 | 4,5 | 3,5 | 4 | 3,5 |
| IE24 | 4 | 4 | 4 | 4 | 3,5 | 4 | 3,5 | 4 | 3,5 | 4 | 3,5 | 4 | 3,5 | 4 | 3,5 | 4 | 3,5 | 4 | 3,5 | 4 |
| IE25 | 3 | 3 | 3 | 4 | 4 | 4 | 3,5 | 4 | 3,5 | 3,5 | 3,5 | 3,5 | 4 | 3,5 | 3,5 | 3,5 | 3 | 3 | 4 | 3,5 |
| IE26 | 3 | 3 | 5 | 4 | 4 | 4,5 | 4 | 4,5 | 4 | 4,5 | 4,5 | 3,5 | 4 | 3,5 | 4,5 | 4 | 4,5 | 3,5 | 4,5 | 4 |
| IE27 | 4 | 3 | 4 | 5 | 3 | 4 | 3 | 4 | 2 | 4 | 4 | 3 | 4,4 | 3 | 4,4 | 3 | 3,5 | 3 | 4,4 | 3 |
| IE28 | 4 | 5 | 5 | 4 | 3,5 | 4 | 3,5 | 4 | 4 | 4,5 | 4,5 | 4,5 | 4,5 | 4 | 4,5 | 4 | 4 | 4 | 4 | 4 |
| IE29 | 5 | 4 | 4 | 5 | 4,5 | 4,5 | 4,5 | 4 | 4 | 4,5 | 4,5 | 4,5 | 4 | 4 | 4,5 | 4 | 4,5 | 4 | 4,5 | 4,5 |
| IE30 | 5 | 4 | 5 | 5 | 4 | 4 | 4 | 4 | 4 | 4,5 | 4,5 | 4,5 | 4 | 4 | 4,5 | 4 | 4 | 4 | 4,5 | 4,5 |

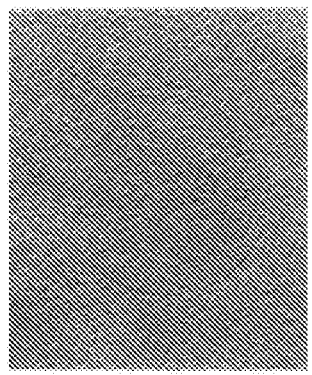
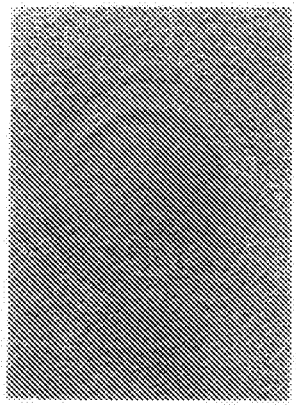
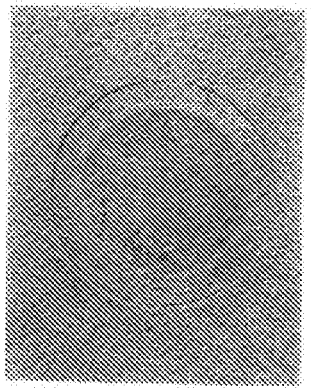
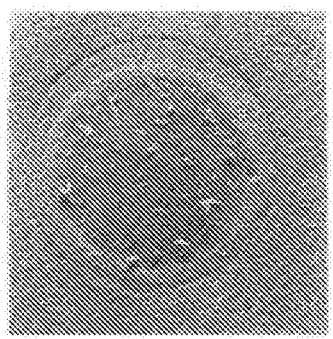
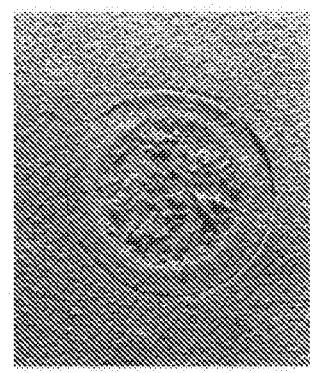
Fig. 8

# PROCESS FOR THE PREPARATION OF A MICROFIBROUS SUEDE-LIKE NONWOVEN FABRIC

CROSS-REFERENCE TO RELATED APPLICATIONS

This application is a 371 national-stage application of International PCT Application No. PCT/IB2018/055720, filed Jul. 31, 2018, which claims priority to Italian Patent Application No. 102017000089038, filed Aug. 2, 2017, all of which are incorporated herein by reference in their entirety.

FIELD OF THE INVENTION

The present invention relates to a process for preparing a microfibrous non-woven synthetic suede-like fabric that does not require the use of organic solvents and which enables a soft finished product to be obtained that is provided with a good hand, that is elastic, with excellent resistance to yellowing, high durability and an appearance that is the same as that of products obtained with the current solvent process.

BACKGROUND OF THE INVENTION

In the prior art, processes are known for preparing microfibrous non-woven suede-like fabrics obtained from so-called "island-in-the-sea" fibres. According to this technology a bicomponent fibre is prepared, consisting of an "island" component completely surrounded by the other "sea" component. Said fibre is obtained by supplying the two polymer components to a spinneret, and is elaborated with prior-art methods (see for example U.S. Pat. Nos. 3,692,423, 3,899,292, 3,531,368). Generally, the fibre that is thus obtained is then used to prepare a felt by needle-punching, which is subjected to various impregnation steps in aqueous solutions and organic solvent to fix and/or remove the various components. For preparing non-woven fabrics with a suede look, the felt obtained by needle-punching is generally subjected to initial impregnation with an aqueous solution of polyvinyl alcohol (PVA), followed by dissolution of the "sea" component, for example in trichloroethylene. The resulting microfibrous intermediate product is impregnated again with a polyurethane solution (PU) in an organic solvent (such as, for example, DMF). Lastly, after one or more washing treatments, the PVA is eliminated and the product that is thus obtained is subjected to finishing treatment that comprises the "splitting" step, followed by buffing and dyeing respectively.

In the prior art, processes are known for preparing a non-woven fabric in which both the impregnation steps are conducted in PU, both aqueous and in organic solvent (see for example EP1353006).

Processes are also known for preparing a non-woven fabric that comprises forming the island-in-the-sea fibre, followed by impregnation in PVA and PU, without using organic solvents (see EP1243691 and EP2780501). Although using water instead of the commonly used organic solvents (such as, for example, DMF and trichloroethylene) constitutes a significant advantage both from the financial and the environmental point of view, and although it is possible to obtain a finished product that is able to maintain the desired hand and resistance features, there nevertheless remains the need to find a process that enables a non-woven fabric to be made with excellent resistance to yellowing, high durability, that is soft, elastic, with a good hand, that has an appearance that is the same as that of the products obtained with the current solvent process and that is achievable with methods with a low environmental impact or which are environmentally compatible and have low production costs.

Further, the process known from EP1243691 provides for the use of certain substances that are potentially harmful to health such as, for example, boric acid. Further, the process variability linked to the partial solubility of PVA complexed with boric acid in the dissolution conditions of the sea component can be an aspect that can lead to a decrease in the efficiency of the process in general.

In patent EP2780501, a process is further disclosed in which the drawback of using boric acid to modulate the solubility in water of PVA is eliminated, but the disclosed process gives rise to a product that has a stiff and cardboard-like hand because of excessive adhesion between the polyurethane and the microfibres that arises after the application of polyurethane dispersed in water and subsequent coagulation by means of the disclosed technologies.

This is linked above all to the operation of splitting after dyeing, which makes the non-woven fabric produced stiff and with a hand on the cut side that is not particularly pleasing because of the failure to remove the polyurethane on the cut side before the dyeing process. The surface appearance of the finished product is moreover not comparable with that of the products that are obtainable with the current solvent process, because of the fact that the microfibre is excessively glued by the polyurethane, also on the surface, making certain surface fibres look as if they were macrofibres.

The applicant has now devised a process for preparing a microfibrous non-woven fabric that enables water to be used instead of the organic solvents, but obtaining, unlike the already known water processes, a non-woven fabric provided with excellent resistance and hand, improved resistance to dyeing and no defects caused by the excessive adhesion between microfibre and polyurethane, such as for example noisiness and low resilience, a stiff and cardboard-like hand and the permanence of cracks following rolling. The product obtained is moreover elastic and also has great durability and resistance to yellowing; the surface appearance is moreover identical to that of the product obtained with the current solvent process.

SUMMARY OF THE INVENTION

In a first aspect, the present invention relates to a process for preparing a microfibrous non-woven fabric comprising the steps of:

a) preparing a bicomponent fibre of the island-sea type in which the sea component is a polymer that is removable in hot water or in an aqueous alkaline solution;

b) preparing a felt by needle-punching the bicomponent fibre of the "island-in-the-sea" type;

c) hot impregnation of said felt with a polyvinyl alcohol (PVA) aqueous solution having a degree of saponification of at least 94%, possibly supplemented with a water-soluble organic or inorganic salt;

d) removing the sea component from the felt impregnated with PVA obtained in step c) by contact of the felt with an aqueous basic solution of an alkaline or alkaline earth hydroxide, thereby obtaining a microfibrous intermediate product;

e) washing the microfibrous intermediate product of point d) with neutral water containing a water-soluble organic or inorganic salt or with acid water or, if the polyvinyl alcohol (PVA) aqueous solution of step c) is supplemented with a water-soluble organic or inorganic salt, with neutral water;

f) performing cold impregnation of the microfibrous intermediate product specified in point e) with a polyurethane (PU) dispersed in water containing additives for adjusting viscosity and possible water-soluble substances;

g) fixing the PU to the microfibrous intermediate product by means of coagulation of the PU dispersion and subsequent drying;

h) removing the PVA added at point c), the salt possibly added at point c) and/or e) and the additives added at point f);

i) subjecting the material thus obtained to cutting, buffing, on one or both sides, and dyeing.

The dyed non-woven fabric that is thus obtained already has excellent sensory features in terms of hand and drape, but increasing physical-mechanical resistance enables the non-woven fabric, if necessary, to be subjected to subsequent dry softening treatments or treatments in low temperature water, adding if required silicone agents to give the product a softer hand (step l)).

The non-woven fabric manufactured according to the present process can be further buffed on the side in contact with the blade (step m)), if this treatment was necessary to increase or modify the contact surface in order to be able to subject the non-woven fabric to further post-processing, such as for example gluing to fabric supports, spreading with resins and fireproofing and/or for further reducing the thickness of the dyed non-woven fabric or also for further softening the finished material.

In a further aspect, the invention relates to microfibrous non-woven synthetic suede-like fabric obtained (or obtainable) with the present process.

BRIEF DESCRIPTION OF THE FIGURES

Further features and advantages of the invention will be illustrated below with reference also to the attached figures in which:

FIG. 6 contains Table 1 showing the impregnation weight ratios according to example 1 and the subsequent treatments.

FIG. 7 shows Table 2 containing the evaluations of the prototypes obtained according to the present invention in comparison with the prototypes made according to patent EP1323859 (solvent process, prototype A) and the examples 2.2 (prototype B) and 1.1b (prototype C) disclosed in patent EP2780501.

FIG. 8 shows the Martindale scale used to evaluate the appearance of the microporous product after the abrasion test using a Martindale abrasion tester.

DETAILED DESCRIPTION OF THE INVENTION

Figure 1:
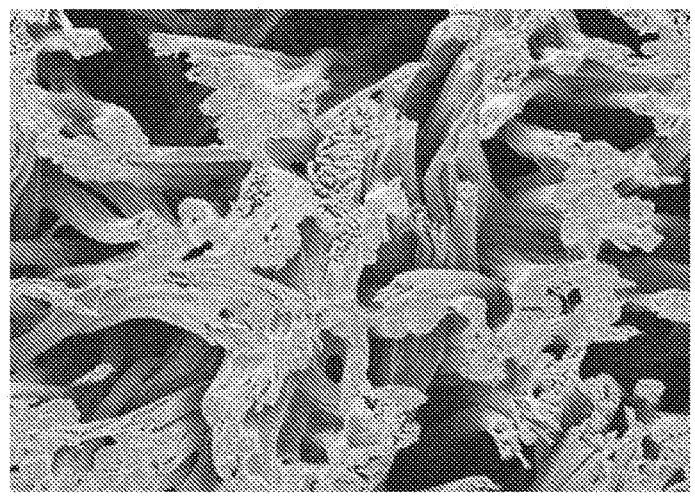
FIG. 1 shows a section of a microfibrous intermediate product impregnated with a preparation of polyurethane dispersed in water and subsequently subjected to removal of the PVA (step h)); the polyurethane preparation contains a water-soluble polymer that is able to modify the adhesion of the polyurethane to the microfibre once removed in step h) together with the PVA applied in step c).

In the process of the present invention, preparing the felt according to step b), occurs by needle-punching of a bicomponent fibre of the "island-in-the-sea" type obtained in step a). The latter can be obtained according to prior-art techniques, which provide for the feeding of two pure polymers or two mixtures of polymers with additives to a spinneret so that one of the two polymeric components ("sea") completely surrounds the other component consisting of various polymeric filaments that form the various "islands".

The island component can be chosen from: modified polyesters, cationic polyesters, nylon or other types of polyamides, polyethylene (PE), polypropylene (PP), polytrimethylene terephthalate (PTT), polybutylene terephthalate (PBT), polyhydroxyalkanoates (PHA), polyethylene furanoate (PEF), polylactic acid (PLA) and polyethylene terephthalate (PET), the latter being particularly preferred. The aforesaid polymers can be produced from raw materials made from renewable sources (which completely or partially replace current fossil raw materials) or the polymers themselves can be producible through fermenting processes or through the use of microorganisms. Examples of polymers belonging to the first case are PTT, PEF, PET and PLA, PE. Examples of polymers belonging to the second case are PHAs.

An example of a sea component is instead a spinnable polymer, preferably chosen from: polyvinyl alcohol (PVA), polystyrene copolymers containing PVA (co-PVA-PS), styrene copolymers containing maleic anhydride or other organic monomers in the chain (co-PS), copolyesters containing PVA (co-PVA-PES), copolyolefins such as polyethylene or polypropylene containing PVA (respectively co-PVA-PE, co-PVA-PP), copolyesters containing a mixture of terephthalic acid+isophthalic acid+5-Sulfoisophthalic acid (HWS) and copolyesters containing both terephthalic acid and 5-Sulfoisophthalic acid or the sodium salt thereof (co-PES, which can also be abbreviated with the acronym TLAS), the latter being particularly preferred.

Both the sea and island components can be used in a mixture with added components selected from: pigments for the island component, and incompatible polymers for the sea component. The incompatible polymers (i.e. immiscible with the sea component) produce a heterogeneous system that, at the microscopic level, has zones dispersed in the matrix consisting of the second polymer, in which only one of the polymers is present; in general these systems are fragile and if they are used to form the sea component they facilitate the break of the shell during the steps of stretching, crimping and producing the felt intermediate product.

UV stabilisers and carbon black can be mentioned as pigments inserted into the island component, carbon black being particularly preferred because it enables to reduce the quantity of dyes that are used in dyeing to produce dyed materials in the grey/black and dark colour ranges, to obtain very high lightfastness, thus saving on the cost of the dyeing process. The UV-stabilising properties of carbon are in fact known that, combined with the reduction of the dye content used in the recipe, enables the colour deterioration to be diminished following exposure to UV and the cost of producing dyed material to be reduced owing to the saving in the quantity of dyes to be used. If it is not possible to use carbon black (production of very light colours), using UV stabilisers nevertheless enables the lightfastness of the tinted materials to be increased. The dyes, especially if they are selected from materials with great lightfastness, usually have a great impact on the final cost of the product. PVAs added to the co-PES and polyethylene glycols (PEG) added to the co-PS can be mentioned as polymers that are incompatible with the sea component.

In one particularly preferred embodiment, the felt of step b) is obtained by needle-punching of a bicomponent fibre formed by PET and co-PES (possibly added-to with pigments in the island component and/or with incompatible polymers in the sea component), cut into flock measuring about 51 mm.

The ratio between the island component and the sea component of the bicomponent fibre is such as to enable the spinning of the two components by means of a spinneret rapidly and efficiently. Said island/sea ratio is preferably within the range of 20:80 and 80:20, more preferably within the range of 50:50 to 80:20. Island/sea ratios below 50:50 increase the quantity of sea component to be removed with consequent increase of the cost of the product and lead to a clear loss of physical/mechanical properties of the processed bicomponent fibre (the sea component is weaker), in addition to finished products with a poor appearance due to the low density of fibre on the surface. Island/sea ratios above 80:20 make the spinning process difficult because the low quantity of sea component does not enable the microfibres inside the bicomponent fibre to be maintained well separated.

Before the needle-punching process, the bicomponent fibre is normally treated according to methods known in the prior art that involve adding lubricating oils in the stretching step to improve the orientation of the macromolecules in the axial direction and the physical/mechanical properties therewith, in addition to reducing the titre of the fibre that is thus obtained, this feature is particularly requested for producing high quality products. In a preferred embodiment of the invention, the fibre, before being stretched, has titre comprised between 5.5 and 19 dtex, preferably comprised between 7.5 and 15 dtex. Stretching is further conducted in ratios that generally vary within the range 2-5, preferably within the range 2.1-3.9. At the end of stretching, the fibre is then cut to produce a flock having a length comprised between 45 and 55 mm. After step b), a felt is obtained having a thickness preferably comprised between 2 and 4 mm, and an apparent density comprised between 0.1 and 0.5 $g/cm^3$, more preferably comprised between 0.15 and 0.25 $g/cm^3$. Advantageously, said density and thickness values are optimum for obtaining a non-woven end product provided with a good hand, softness, elasticity, appearance and mechanical resistance to the process conditions. During preparation of the felt, it is particularly important, for the purpose of the absence of the defect originating from the cracks (cracks highlighted by rolling) on the side s obtained by cutting the product in step i) to subject the flock, in the initial steps of the needle-punching process, to alternating penetration of the needles on both sides of the felt being formed to avoid the fibres having an excessive orientation according to a preferred direction.

The felt obtained after step b) is thus impregnated with a hot aqueous PVA solution having the feature of becoming less soluble in conditions of removing the sea component once it has been possibly dried and treated at a high temperature.

Hot impregnation of the felt with PVA solution occurs at a temperature of at least 50° C., preferably comprised between 60 and 99° C., so as to also obtain dimensional stabilisation of the intermediate product owing to the release of the tension accumulated during the process of spinning, stretching and felting. The dimensional stabilisation generally also produces an increase in density with resulting improvement of the aesthetic features of the obtained end product.

In one embodiment of the process of the invention, a water-soluble organic or inorganic salt is added to the aqueous solution of PVA before impregnation (step c)), preferably in a salt/PVA weight ratio comprised between 0.1% and 20%, preferably between 5% and 12% by weight. The preferred salts are alkaline metal salts such as, for example, NaCl and KCl.

Alternatively, a solution containing a water-soluble organic or inorganic salt can be used, in a subsequent step (step e)), to wash the microfibrous intermediate product impregnated with PVA.

The pure PVA or PVA to which a salt has been added that is used in step c) is characterised by the fact that it has solubility in water or in water solutions that is significantly below the solubility of the "sea" component of the bicomponent fibre in the dissolution conditions.

For this purpose, the present process provides for using a PVA with a high degree of saponification, i.e. of at least 94%, even more preferably above 97%. Said degree of saponification enables the PVA to be treated in such a manner as to reach insolubility in a water environment so as to resist the subsequent sea component removal treatment (step d)), without jeopardising dissolution thereof in water in step h) of the process as disclosed below. Advantageously, using PVA with said degree of saponification enables step c) to be performed without the use of any cross-linking agent, as on the other hand contemplated in the prior art, such as, for example, boric acid or vanadium or zirconium compounds, which are potentially harmful to health. The solubility of the PVA can be modulated not only by using PVA with a high degree of saponification and adding a salt, but also by heat treatment (also known as heat curing) at high temperature or radiation, conducted at the end of step c) of impregnation with PVA and subsequent drying. In particular, the felt impregnated with PVA is treated after drying at a temperature of at least 100° C., preferably comprised between about 140° C. and about 250° C. for example by using air jet ovens or infrared radiation, for a time that can vary from less than a minute to about 15 minutes, depending typically on the temperature used, on the required degree of resistance to dissolution, on the degree of saponification and on the salt content that has possibly been added to the PVA.

In this way, it is possible to fix the PVA stably to the felt, enabling the subsequent step of removing the "sea" component to be performed, without substantially modifying the content and distribution of the PVA in the material.

In this context, the step d) of removing the "sea" component takes place through contact of the felt impregnated with PVA obtained in the preceding step c) with an aqueous basic solution of alkaline or alkaline earth hydroxide, preferably NaOH or KOH. Said contact occurs preferably by immersion (washing) of the felt impregnated with PVA in the chosen aqueous basic solution and is followed by repeated washing with neutral water, which may or may not contain an organic or inorganic salt solution, or acidic water to neutralise the solution and form the salt "in situ" (step e)), in order to ensure removal of possible residues of alkaline solution that could cause partial hydrolysis of the microfibre during the drying step and/or deposit near the surface of the microfibre and inside the PVA a concentration of salt that is useful for influencing the subsequent step of impregnation with polyurethane. Of the salts that are usable and obtainable by naturalization in the washing step, alkaline metals such as for example NaCl and KCl are particularly effective.

Alternatively, the organic or inorganic salt solution can already be present in the PVA because it is added in step c) of the process, so after the step in an aqueous basic solution to remove the sea component, washing the felt containing PVA and salt is performed with a neutral aqueous solution.

The pH of the basic solution used to remove the sea component is preferably comprised between 10 and 14. In one embodiment, the concentration of the basic solution is comprised between 0.1% and 48%, preferably between 5 and 12%. Low concentrations of basic solution slow down the dissolution process; excessively high concentrations on the other hand decrease removal selectivity between sea component and microfibre and moreover induce the precipitation of the sea component removal products in the basic extraction solution.

Removing the "sea" component according to step d) occurs at a temperature and for a time chosen to optimise selective dissolution of this component, dissolving the minimum possible quantity of PVA applied, at the same time avoiding degradation of the microfibre of the "island" component. In order to obtain a more effective removal and shorter times, the temperature of the basic solution is preferably at least 40° C., more preferably at least 60° C., even more preferably comprised between 60° C. and 80° C. In the literature it is known that the presence of positive metal ions such as $Na^+$ or $K^+$ and anions such as $SO_4^{2-}$ obstruct the loss of PVA during the removal of the sea component (effect known by the term "salting out"). This enables the basic solution to be also used at temperatures above 60° C. without there being major losses of PVA during the process of removing the sea component. Excessively high temperatures nevertheless make it difficult to control the process of removing the sea component and lower the removal selectivity between sea component and microfibre. When co-PES is used as the sea component, the 5-Sulfoisophthalic acid (SIPA) content inside the polymer greatly affects the solubility of the polymer in the alkaline solution used for the removal thereof. In particular, SIPA content below 8% by weight requires, for the same contact time with the alkaline solution, co-PES dissolution conditions that are more drastic such as for example a greater concentration of sodium hydroxide and/or a higher temperature in the process. But altering these parameters adversely affects selectivity between removal of the sea component and degradation of the polymer constituting the islands and moreover phenomena of precipitation of the products removing the sea component can be caused in the basic extraction solution (linked to the concentration of the solution of sodium hydroxide in solution). On the other hand, SIPA content above 12% makes the sea component less crystalline with possible loss of part of the polymer during the productive process and adversely affect the physical/mechanical characteristics of the bicomponent fibre produced. The SIPA content present in the co-PES thus has to be preferably comprised between 8 and 12%, more preferably between 9% and 11%.

Further, the quantity of SIPA has to be balanced to enable concentrations of sodium hydroxide or potassium below about 12% to be used, a limit beyond which the phthalic oligomers produced following the hydrolysis process are precipitated.

The heat treatment or radiation step after drying the PVA at high temperature cannot be performed (if a minimum PVA loss is accepted) in order to avoid excessive overheating of the bicomponent fibre: high temperatures in fact increase the crystallinity of the fibre because of a reorganisation of the crystalline domains of the microfibre and of the sea component thereof. The advantages of minor heating are greater softness for the microfibre and consequently for the finished product obtained and greater ease of dissolution for the sea component.

Owing to the fact that the crystallinity of the sea component is not increased, the dissolution temperature of the basic solution can then be lowered to values comprised between 35° C. and 50° C., thus improving also hydrolysis selectivity.

The microfibrous intermediate product obtained by removing the sea component, can be washed by using cold water or moderately hot water (step e)). The cold water, at a temperature below 40° C., prevents even partial removal of PVA occurring during removal of the residues of basic solution; using moderately hot water, at a temperature comprised between 40° C. and 80° C., on the other hand, enables the density of the microfibrous intermediate product, that is now deprived of the sea component, to be increased further, thus enabling particularly high densities to be reached and materials to be produced with an even richer appearance although, on the other hand, loss by PVA can be caused.

A preferred embodiment of the invention consists of using a saline washing solution containing alkaline or alkaline earth metal salts (step e)), which in addition to hindering the loss of PVA in water, leave on the intermediate product a layer of salt that can then influence the adhesion and the stability of the polyurethane used in the subsequent impregnation step f), especially near the surface of the material, so as to obtain an appearance after dyeing that is particularly rich and similar to that of the current solvent process. These salts can thus be added both to the washing solution and be obtained by neutralisation of the residual sodium hydroxide or potassium with diluted solutions of strong or weak acids, creating in the latter case a buffer system. Water temperatures below 60° C. enable PVA loss to be limited to values below 10% of the initial content or to values close to zero if the PVA is sufficiently locked in the preceding heat treatment phase.

The presence of salt near the surface enables the distribution of the polyurethane applied in subsequent step f) to be altered by limiting in particular the quantity thereof near the surface of the intermediate product.

The microfibrous intermediate product devoid of the "sea" component, and with the possible presence of salts around the microfibre and in the PVA, is then subjected to step f) of impregnation with PU.

As known, PU is a polymer having a polymer chain formed by only urethane bonds (i.e. —NH—(CO)—O—) or by a mixture or urethane and ureic bonds (i.e. —NH—(CO)—NH—), and is prepared by reaction between a polyol or a mixture of polyols and a diisocyanate. In order to facilitate the dispersion of the polymer in water, it may be useful to add to the chain, ionomers (molecules containing ionic groups that bond like the polyoles with the isocyanate). In the present invention, the PU is preferably obtained by the reaction of an aliphatic or aromatic diisocyanate, with polyols having an average molecular weight comprised between 500 and 5000 Da, even more preferably chosen from: polyether, polyester, polycarbonate and polyester-polycarbonate. Polyols can also be used that are obtained from processes of dimerisation of fatty acids or from polymerisation of olefins, which enable functionalities with great hydrophobicity to be introduced in the chain in order to increase the resistance of the polyurethane to the hydrolysis processes and to increase the total content of raw materials from renewable sources present in the dyed material (processes for producing simple olefins through fermentation processes and subsequent unsaturation are already known). It is also possible to include in the reaction polydimethylsiloxanes to obtain hybrid PU in order to increase the mechanical and hydrolysis resistance properties. It is possible to add small quantities of trifunctional monomers to the polyurethane chain or chain terminals of the aminosilane type during the process of synthesis to increase the resistance of the polymer to hydrolysis, once applied and subjected to cross-linking.

The aforesaid raw materials can be obtained by productive processes that use first generation renewable sources (from food products), second generation renewable resources (agricultural or industrial waste) or third generation renewable resources (direct synthesis from $CO_2$).

The PU can be present in an aqueous environment, for example in emulsions or aqueous dispersions. It is possible to use also bicomponent polyurethanes, reactive systems characterised by the separation of part of the reagents that, once they are mixed before being applied, start to react in situ or react once they are activated thermally or by adding catalysts and produce the finished polymer directly inside the microfibrous intermediate product in which they have been applied. These systems, which are normally devoid of solvent, give anyway good impregnation results because, until the end of the reaction, the viscosity thereof is sufficiently low as not to hinder the diffusion thereof inside the microfibrous intermediate product.

Alternatively to the polyurethanes, it is possible to use mixtures of polyurethanes with other elastomeric polymers, such as for example silicone polymers, polyisoprenes, polybutadienes and the copolymers thereof or styrene-butadienes and polymers of natural origin (such as for example natural rubber latex as such or prevulcanised rubber latex).

Preferably the concentration of the impregnation solution is comprised between 8 and 40%, more preferably comprised between 15 and 30%. Concentrations above 30% could make the impregnation step difficult and limit the polyurethane content in the finished product, whereas concentrations below 8% could cause poor stability of the PU dispersion over time and significantly modify the structure of the solidified polyurethane and the type of adhesion between polyurethane and microfibre to the point that the resistance of the intermediate product being dyed is compromised. Impregnation with PU according to step f) typically occurs by immersion and dosing with pressing rollers or by prior art techniques (for example, pressure waves). Preferably, the microfibrous intermediate product is impregnated with PU by immersion and dosing with pressing rollers.

Impregnation with PU in an aqueous environment can be suitably performed by using a so-called self-emulsifying polyurethane polymer (that contains in the chain only the ionomer), and/or by the addition of suitable external emulsifiers, such as for example both ionic and non-ionic surfactants. Preferably, the emulsifiers are used in concentrations comprised between 0.5 and 10% with respect to PU.

In order to obtain the desired mechanical features and resistance to solvents, the impregnation of step f) can occur in the presence of a cross-linking agent that is preferably able to be activated during the PU drying step at a temperature comprised between about 60° C. and 200° C., preferably comprised between about 70° C. and 160° C.; the cross-linking time is generally less than 5 minutes at the aforesaid temperatures and tends to be completed generally within the following 24 hours.

Said cross-linker is preferably used in quantities comprised between 0.5 and 10%, and can be chosen from: melamines, aziridines, epoxides, zirconium compounds, carbodiimides, isocyanate derivatives or preferably, blocked isocyanate or polyisocyanate with low deblocking temperature (temperature at which certain particularly stable groups are freed from the molecule, thus regenerating the isocyanic group that can react again with the polyurethane chains present). Carbodiimides and the blocked isocyanates, are particularly preferred because they enable greater control of the process and longer stability time of the dispersions to be obtained.

Impregnation with PU occurs in the presence of additives for adjusting viscosity, which are thickener substances that increase the viscosity of the dispersion, in this manner enabling the migration of the polyurethane along the thickness during the drying step to be controlled. Dispersions with viscosity below 200 mPa·s at 20° C. give rise to great migration of the polyurethane to the surface with consequent alteration of the distribution of the polymer along the thickness; this leads to an excessive presence of polyurethane on the surface and the emergence of defects like specking and torn nap (too much polyurethane on the surface makes the buffing operation difficult by excessively locking the microfibres that are in contact with the abrasive paper and facilitating fatigue failure thereof because of the stress, a phenomenon that is also known as "nap cutting") or irregular (certain microfibres or groups of microfibres on the surface, wrapped by the polyurethane, resist the mechanical action of the abrasive paper during the buffing process and produce fibres locally that are bigger and have a greater length, as in FIG. 2A). Viscous dispersions, with viscosity greater than 8000 mPa·s at 20° C. hinder migration of the polyurethane during the step of fixing the polymer g) determining the formation of polyurethane residue that remains in the centre of the impregnated intermediate product. This accumulation of polyurethane on the inner surface that occurs after the splitting step (side s) could lead to the formation of a non-woven fabric that is excessively stiff and cardboard-like if the polymer layer is too compact. The dyed intermediate product is thus particularly stiff unless a further buffing step is performed after dyeing the manufactured material in order to remove part of the polyurethane found on side s (side originated after splitting); however this leads to a greater cost of the manufactured material because of the greater number of processes. Excessively viscous Newtonian dispersions (viscosity above 10000 mPa·s at 20° C.), moreover make the impregnation process difficult by hindering the entry of polymer throughout the thickness of the microfibrous intermediate product.

Viscosity control is thus a key parameter for obtaining a material with a suitable distribution of the polyurethane along the thickness and thus with a soft, non-cardboard-like hand and with a homogeneous appearance.

The so-called polyurethane associative thickeners (HEUR) are particularly effective additives for adjusting viscosity, they create polyurethane-thickener associative structures that migrate with difficulty during the process of drying or coagulation and give rise, once they have set, to less compact polymer aggregates.

Alternatively, additives that increase the viscosity of the dispersing means (water) can also be used, in this manner making the migration of polyurethane through the microfibrous support difficult during the drying or coagulation process. Acrylic acid derivatives (such as for example polyacrylates or urethane/acrylic resins), additives like synthetic polymers such as PVA, compounds deriving from natural polymers like carboxymethyl cellulose (CMC) and some complex sugars like for example xanthan, belong to this category. Associative thickeners and acrylic thickeners, added pure or in a mixture are particularly preferred.

Advantageously, it is also possible to use PU emulsions or dispersions in water with a higher viscosity (i.e. with a viscosity above the set limits), if non-Newtonian thickeners are chosen. Said non-Newtonian thickeners are in fact provided with the property of temporarily reducing the viscosity of the polyurethane emulsion or aqueous dispersion during the impregnation step performed with pressing rollers. Said temporary loss of viscosity occurs because of the great stress present in the pressing rollers. At the end of impregnation and the associated stress, the viscosity of the polyurethane emulsion or aqueous dispersion increases again, effectively hindering the migration of the polyurethane to the surface.

The polyurethane can also be pigmented with carbon black or other pigments to give the finished product a colouring that limits the perception of the polyurethane after dyeing.

A further unexpected aspect that makes the invention particularly interesting is the presence of salts on the fibre and in the PVA of the intermediate product to be impregnated with polyurethane. When the polyurethane approaches zones of the intermediate product that are particularly rich in salts, the aqueous dispersion containing the polyurethane is destabilised and the polymer is unable to adhere effectively to the microfibre.

Figure 2A:
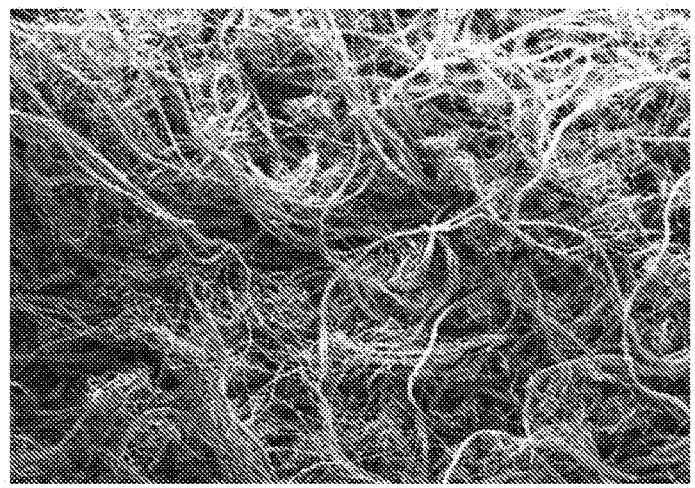
FIG. 2A shows the surface of a microfibrous intermediate product impregnated with a preparation of polyurethane dispersed in water and subsequently deprived of the PVA (step h)).
Figure 2B:
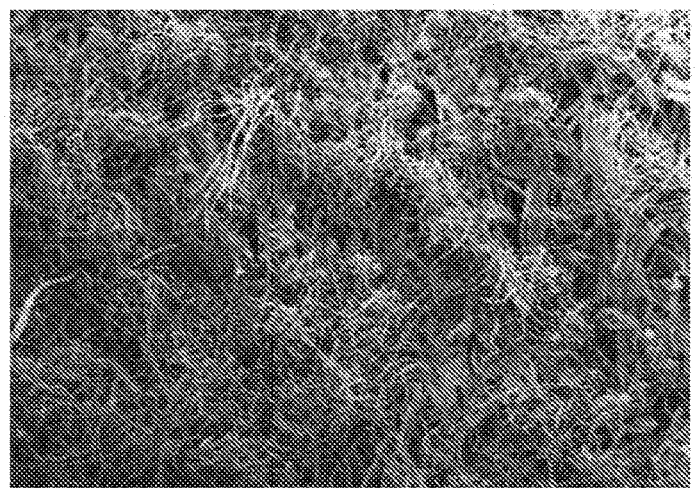
FIG. 2B shows the surface of a microfibrous intermediate product impregnated with a preparation of polyurethane dispersed in water and subsequently deprived of the PVA (step h)); the surface of FIG. 2B is distinguished from that of FIG. 2A by the fact that near the two outer surfaces the presence of salts added to the intermediate product in step e) (before impregnation with the polyurethane), has enabled the quantity of polyurethane that is present on the surface to be limited, facilitating in this manner the separation of the microfibres during the buffing and dyeing process with significant improvement to the appearance of the surface of the product.
Figure 3:
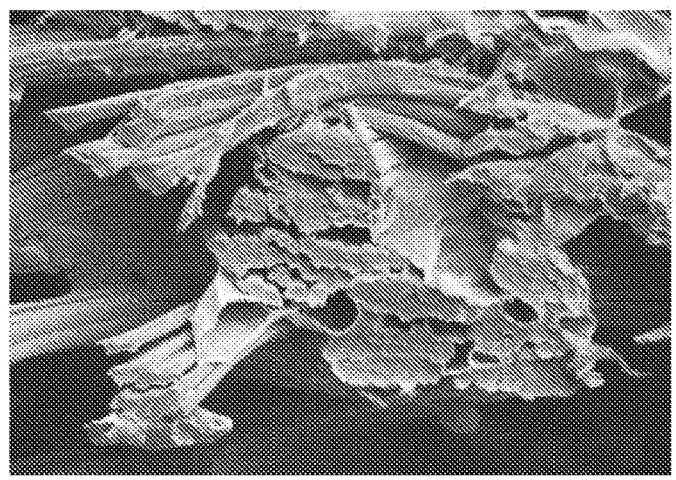
FIG. 3 shows a microfibrous intermediate product impregnated with a preparation of polyurethane dispersed in water and deprived of the PVA (step h)) that differs from the preceding ones by the fact that during preparation an additive was added that is able to swell during drying, producing artificial expansion that reduces the density of the polyurethane matrix. In this case, the particles are first swelled and are then exploded in order to generate porosity inside the polyurethane matrix.

Further, in zones that are rich in PVA (near to the surface of the material), there is an even more marked effect that is reflected in the almost total absence of polyurethane, which detail enables the microfibre to be effectively freed during the buffing step and give rise after dyeing to a product with a particularly rich and uniform appearance, which makes the non-woven fabric that is thus obtained very similar to that of the current process with solvents (comparison between FIGS. 2A and 2B). The lesser adhesion between the fibre and polyurethane is also reflected in an increase in the softness of the dyed product with respect to the materials obtained by a process without solvents in which there are not salts present in the polyurethane or in the intermediate product to be subjected to impregnation with polyurethane. If adhesion is excessively low, however, the obtained product does not resist the final dyeing step where the material is subjected to the combined action of pressure, temperature and mechanical stress (typical technology of dyeing of polyester fibres).

In the intermediate products treated with salt, the lesser adhesion of the polyurethane, together with the formation of a more porous PUD structure because of the loss of salt in washing step h) after fixing the polyurethane makes the intermediate product more porous and at the same time more elastic, leads to the production of non-woven fabrics characterised by a rich appearance, a softer hand and with a clear improvement in terms of elasticity and resistance to abrasions. Impregnation with PU, can moreover occur in the presence of further additives such as, for example, surfactants, destabilising agents, other alkaline metal salts or earth alkaline salts, acid generators that release protons when they are heated such as for example diethylene glycol acetate or diethylene glycol formate, water-repellent agents, plasticising agents, wetting agents and dispersing agents, silicone compounds, and nanoparticles, nanofibres and nanotubes that are dispersible in water, preferably in a quantity comprised between 0 and 15%, more preferably comprised between 0 and 8% with respect to PU. One example of alkaline earth salt is $CaCl_2$ and it is used to promote the destabilisation of the polyurethane dispersion as the temperature increases (in the case of PUs that coagulate thermally).

In addition to the additives mentioned, water-soluble substances can also be added to the polyurethane such as, for example PVA or a polymer similar to the sea component of the microfibre but characterised by good solubility in hot water (for example the hot water soluble polymers and some co-PES), which after cold impregnation of the microfibrous intermediate product according to step f) of the process that is the object of the present invention, are removed in the hot removal step h) and generate in this manner artificial porosity that improves the hand and the softness of the product.

Another type of additives that can be added to the polyurethane in order to create porosity in the structure thereof are the expandable microspheres, such as, for example, the Akzo Nobel products known as Expancel®: these are hollow particles of a dispersed polymer that contain internally a low boiling liquid. During the polyurethane drying and fixing step that follows the impregnation step f), owing to the expansion of the contained liquid, these particles swell, creating zones with low polyurethane content. If the heating proceeds as far as exploding these hollow particles, microporosity is created that is linked to the dimensions of the hollow particles, to the type of liquids contained therein and to the concentration of these particles in the PU dispersion.

A similar effect can also be obtained by adding to the polyurethane preparation dispersed in water to be used in the impregnation step f), a water soluble substance such as an unstable salt (for example $NH_4HCO_3$ or $(NH_4)_2CO_3$) that when it decomposes through heating already at a temperature of 60-70° C. it produces large quantities of gas that can generate artificial porosity in the structure of the polyurethane being dried, promoting in this manner the manufacture of softer non-woven fabrics.

A further type of polymer that can be added to the PU to increase the porosity and the softness of the final non-woven fabric are polymers that are partially mixable with the PU that enable non-homogeneous structures to be generated that are able to make the PU less compact and thus softer. One example are the mixtures of polyurethane and silicone polymers.

Subsequently to the impregnation step f), the microfibrous intermediate product is subjected to the PU fixing step g). Fixing can occur through: hot air coagulation, hot water coagulation, coagulation in aqueous solutions of electrolytes, radiofrequency coagulation, microwave coagulation, ultrasound coagulation, coagulation by IR (infrared) radiation or steam coagulation. Preferably, air coagulation occurs, obtaining in this manner the fixing of the PU thermally or coagulation can be achieved in aqueous solutions containing salts (such, as for example, alkaline and alkaline earth metal salts) or acids that destabilise the dispersion (like for example organic acids such as formic acid, acetic acid, propionic acid, oxalic acid, malonic acid, succinic acid, maleic acid, fumaric acid or inorganic acids such as hydrochloric acid, sulphuric acid, phosphoric acid).

In the case of hot air coagulation, the material obtained after the step f) is brought into contact with air at a temperature comprised between about 50° C. and about 200° C., preferably comprised between about 50° C. and 160° C. in order to control better the migration of the polyurethane during heating; the duration of heating can for example vary according to the type of polyurethane used inasmuch as in the case of use of polyurethanes that coagulate thermally, it is possible to limit the heating of the impregnated intermediate product, avoiding complete drying and saving in this manner on the quantity of energy required to evaporate the water present. Preferably, the PU is coagulated on the microfibrous intermediate product in an oven, preferably a pin oven, at increasing temperatures comprised between 50° C. and 160° C. Said temperature gradient prevents the water from evaporating so fast as to also take the solid part of the dispersion to the surface, before it receives sufficient heat to degrade any surfactants present that stabilise the PU.

The hot-air coagulation as disclosed here advantageously enables a finished product to be obtained that is provided with excellent resistance and durability. Further, with hot air coagulation, the PU tends to become transparent, thus making possible specking phenomena less evident.

In the case of coagulation in an aqueous solution containing dissolved electrolytes (salts and acids), it is possible to obtain coagulation of the polyurethane at a low temperature (i.e. at a temperature not above 70° C.) with significant energy saving. In this case, the impregnated intermediate product obtained after the step f) is brought into contact, preferably by immersion, with water at a temperature comprised between about 20° C. and 90° C., preferably comprised between about 40° C. and 80° C., containing a certain quantity of a destabilising agent (electrolyte) of the PU dispersion, that enables the temperature at which the PU starts to coagulate (also defined by the term "cloud point"), to be lowered.

One example of a destabilising agent are halides and sulphates of calcium and magnesium, preferably $CaCl_2$ and $MgSO_4$. The chosen agent can be used in quantities comprised between 0.01% and 5% by weight, more preferably comprised between 0.1% and 1%. Hot-water coagulation is particularly appropriate when improved softness of the end product is desired.

Another example of a destabilising agent are the acids added to the coagulation solution that cause protonation of the anionic groups present in the polyurethane chain (introduced in synthesis, adding ionomers together with polyoles and isocyanate). Such acids can be chosen for example from organic acids like formic, acetic, oxalic, maleic acid or inorganic acids such as hydrochloric, sulphuric, phosphoric acid.

In a preferred embodiment of the invention, moreover, in order to minimise the migration of polyurethane during the process of coagulation and/or minimise the loss of polyurethane in the coagulation tank, a thickener agent is also added to the preparation containing the PU that is able to increase the viscosity of the preparation. Preferably, the thickener is of associative type, i.e. is able to be associated with the PU present in aqueous dispersion already in the form of micelles and in this way produce more complex dispersed structures in which the micelles are aggregated together. The operation of these associative systems is well known to those skilled in the art. Another type of particularly effective thickeners are polyacrylate thickeners, which not only increase the viscosity of the preparation but also induce a modification to the structure of the polyurethane coagulated with formation of irregular and partially porous surfaces. Mixtures of these two types of thickener are also particularly effective, so as to act simultaneously on both the steps of the dispersion (water and polyurethane).

In the case of hot air coagulation, it is preferable to use polyurethane thickeners of associative type because those of acrylic type generally impose stiffness on the polyurethane to which they are added.

The intermediate product, once the polyurethane has coagulated and before the finishing, is possibly subjected to cross-linking treatment of the polyurethane owing to activation of the cross-linking agents present in the impregnation formulation. The cross-linking treatment, consists generally of heating the material at a sufficiently high temperature to trigger the cross-linking process and/or release the blocked isocyanates possibly added to the impregnation formulation (step f)) and bond together polyurethane molecules, increasing in this manner the resistance thereof to the subsequent dyeing process (step i)).

The cross-linking process can also be activated or assisted by using UV rays if the cross-linker or other additives can absorb the UV radiation, triggering the process.

The fixing process of step g) can be preceded by radiation with IR lamps or radiofrequencies or microwaves to rapidly preheat the dispersion of polyurethane, thus facilitating fixing thereof in the innermost layers, far from the surface. Of these pretreatments, the step with IR lamps is particularly preferred because this type of radiation acts from the surface onto the entire mass of polyurethane so as to control the movement along the thickness. The effect of using IR lamps on the impregnation and coagulation process is comparable with the result obtained by adding salts before impregnation of the polyurethane (step e)).

Selecting the suitable IR wavelength enables the effect on the coagulation of the polyurethane to be modulated by acting prevalently on the surface or affecting the entire mass of the dispersion.

Thereafter, the intermediate product containing PVA and polyurethane is treated with hot water, at a temperature comprised between 80 and 99° C. for removing the PVA and the other additives that have possibly been added previously (step h)).

At the end of the operation of impregnating and coagulating the PU and removing the PVA as disclosed above, the obtained material is subjected to the finishing step i), to give the non-woven suede-like fabric of the invention. In particular, the material is subjected to splitting (cutting), buffing and dyeing operations, which are preferably performed in the disclosed order.

The dyed intermediate product that is thus produced, containing a polyurethane that has ionic groups in the chain (ionomers), can also be subjected to a second dyeing cycle with specific dyes, such as for example cationic, anionic, sulphur-based, vat or reactive dyes, obtaining in this manner also dyeing of the polyurethane elastomer matrix.

The polyester microfibre is generally dyed, as described in the literature and known to those skilled in the art, by subjecting the product to a bath under pressure at temperatures between 120° C.-130° C., in an acid environment the pH of which is adjusted by adding buffer solutions such as for example acetic acid/sodium acetate, using dyes belonging to the family of dispersed dyes and dispersing and levelling agents, to mention the main additives present.

Using the process disclosed in the present invention, it is also possible to carry out the dyeing process using higher pH values (neutral or alkaline environments) without this having an effect on the physical/mechanical and aesthetic properties of the end product; some polyurethane formulations also enable an improvement of the disclosed features to be obtained when dyeing takes place in a basic environment. For this reason, in a preferred version the dyeing step is conducted in a basic environment with pH comprised between 8 and 11 (measured at ambient temperature), obtained by adding sodium salts of weak acids in a suitable concentration (such as for example acetic, citric or carbonic acid), or with suitable buffer systems for a better process control (such as for example amino acid-based buffers).

If required, in order to manufacture particularly soft materials, it is possible for the dyeing process to be followed by a further buffing step on the side (side s) opposite the already buffed side so as to remove part of the polyurethane from the non-visible side of the product with resulting lightening, softening and decrease of the thickness of the finished product. Alternatively, if it is not desired to alter the appearance and features of the end material by acting on the side s, the obtained product can be subjected to a softening treatment that, by means of suitable machines, subjects the obtained product to mechanical stress inside a softening chamber, using the forced ventilation with bayonet technology to vary the air intake that hits the product during processing; these machines determine further softening of the material without detracting from dyeing features (colour fastness), aesthetic features (surface appearance) or physical-mechanical features obtained with the present productive process. In addition, when requested, the softening treatment can be performed, for example, by providing an impregnation step with additives or softeners, such as, for example, silicones that are able to achieve a plasticising effect in relation to polyurethane, so as to modulate the adhesion between the polyurethane and the microfibre or simply modify the surface feel of the product (sliding effect of the hand on the surface of the product).

The material manufactured according to the described process can then be subjected to further post-processing steps such as, for example, gluing with fabric supports, spreading with resins and fireproofing, application of persistent or hidden foam, embossing, ink-jet printing, electrowelding and laser incisions, on one side or the other, in addition to further cutting operations to further reduce the thickness of the dyed product. With the product made according to the present invention, the softening treatment can be performed also after post-processing steps that follow dyeing without this adversely affecting the features of the product in terms of physical/mechanical properties and appearance.

In a further aspect, lastly, the invention relates to a non-woven synthetic suede-like fabric obtained (or obtainable) with the present process. Advantageously, the non-woven fabric that is obtainable with the present process shows significant resistance to yellowing, a good hand and great durability, so that it is particularly suitable for dyeing with light coloured dyes such as for example white. Further, owing to the finishing operations performed as disclosed above, the process of the invention enables a final non-woven fabric to be obtained that can have a thickness that is also less than 0.7 mm but still able to ensure interesting physical/mechanical performance without the assistance of a structural fabric, thus making the process highly versatile and usable in different practical applications.

Further, owing to the use of polyurethanes with ionic groups in the chain, the non-woven fabric that is obtainable with the present process can also be dyed in the polyurethane elastomer matrix. Adding salts to the microfibrous intermediate product before impregnation with polyurethane dispersed in water, just like the coagulation process in an aqueous solution or pre-treatment performed with IR lamps after the impregnation step with polyurethane and before the subsequent drying in the process of coagulation with hot air, enables to minimise the content of polyurethane that is linked to the microfibres near the surface and to better modulate the adhesion throughout the entire thickness of the material, enabling a particularly soft non-woven fabric to be produced, with an appearance that is in all and for all identical to that of the product obtained by today's solvent process, and which is provided with high resistance to abrasion.

Pretreatment with IR lamps also enables the end product to be given greater resistance to abrasion, also with low polyurethane content.

The energy that is necessary for drying can be entirely provided by IR radiation, radiofrequencies or microwaves or combinations thereof, just like the activation of the crosslinker can occur with IR radiation, preferably in the case of low-thickness intermediate products.

The final softening treatments disclosed also enable a product to be obtained that is comparable with the main materials obtainable today through normal solvent manufacturing processes.

The invention will now be disclosed with the following experimental part, which is not however intended to restrict the scope thereof.

EXAMPLES 0. FELT REINFORCED WITH PVA

In the family of examples 0, an intermediate product that is indicated as "D nth", where n is a consecutive number, formed by microfibre and PVA is made. Occasionally, salts may be present.

Example 0.1

Flock is made from a bicomponent fibre of the "island-in-the-sea" type, in which the island component is made of PET and the sea component is made of co-PES. The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.212 g/cm$^3$ and unit weight of 599 g/m$^2$.

The felt undergoes dimensional retraction, going for 5 minutes into an 85° C. solution containing 11.6% PVA with a high saponification value (98%) it is dried in a first oven and is then treated in a second oven at 190° C. for 3 minutes, a sufficient time to enable thermal curing of the PVA, indicated by the amber colouring of the PVA itself. The subsequent step of removing the sea component from the fibre consists of two steps followed by convective drying: an alkaline treatment by caustic soda at 8% by weight at 65° C. and a cold washing in water that is sufficient to return the pH to values below 8. The thus reinforced piece contains PVA that is 28% by weight and is identified as "intermediate product D1".

Example 0.2

Flock is made from a bicomponent fibre of the "island-in-the-sea" type, in which the island component is made of Bio-PET and the sea component is made of Bio-coPES. The Bio-PET has been made by polycondensation of terephthalic acid and ethylene glycol that are both obtained from raw materials generated with fermentation processes and subsequent transformations. In this polymer, the percentage of material from renewable sources is 100% (>95% in terms of $^{14}$C content measured according to standard ASTM-D6866-08).

The Bio-coPES has been made by polycondensation of 5-Sulfoisophthalic acid and terephthalic acid synthesised from fossil raw materials with ethylene glycol obtained by fermentation. In this polymer, the percentage of material from renewable sources is 35% (equal to 20% in terms of $^{14}$C content measured according to standard ASTM-D6866-08).

The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.202 g/cm$^3$ and unit weight of 603 g/m$^2$.

The felt undergoes dimensional retraction, going for 5 minutes into an 85° C. solution containing 11.6% PVA with a high saponification value (98%) and is dried in a first oven and is then treated in a second oven at 190° C. for 3 minutes, a sufficient time to enable thermal curing of the PVA, indicated by the amber colouring of the PVA itself. The subsequent step of removing the sea component from the fibre consists of two steps followed by convective drying: an alkaline treatment by caustic soda at 8% by weight at 65° C. and a cold washing in water that is sufficient to return the pH to values below 8. The thus reinforced piece contains 27% PVA by weight and is identified as "intermediate product D2".

Example 0.3

The intermediate product D1 is immersed in a 1% NaCl solution, wrung out by a pair of rollers to dose the saline solution and then dried again in a convection oven. The thus processed piece contains 23% PVA by weight, 14% NaCl by weight and is identified as "intermediate product D3".

Example 0.4

Flock is made from a bicomponent fibre of the "island-in-the-sea" type, in which the island component is made of PET and the sea component is made of co-PES.

In the extrusion step, the PET is supplemented by masterbatch containing carbon black (CB) at 30% by weight in a PET matrix; the carbon black is thus dispersed at 1% by weight in the PET filaments.

The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.197 g/cm$^3$ and unit weight of 596 g/m$^2$.

The felt undergoes dimensional retraction, going for 5 minutes into an 85° C. solution containing 11.6% PVA with a high saponification value (98%) and is dried in a first oven and is then treated in a second oven at 190° C. for 3 minutes.

The subsequent step of removing the sea component from the fibre consists of two steps followed by convective drying: an alkaline treatment by caustic soda at 8% by weight at 65° C. and a cold washing in water that is sufficient to return the pH to values below 8. The thus reinforced piece contains 28% PVA by weight and is identified as "intermediate product D4".

Example 0.5

Flock is made from a bicomponent fibre of the "island-in-the-sea" type, in which the island component is made of PET and the sea component is made of co-PES. The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.202 g/cm$^3$ and unit weight of 603 g/m$^2$.

The felt undergoes dimensional retraction, going for 5 minutes into an 85° C. solution containing 11.6% PVA with a high saponification value (98%) and is dried in an oven. The subsequent step of removing the sea component from the fibre consists of two steps followed by convective drying: an alkaline treatment by caustic soda at 8% w/w at 45° C. and a cold washing in water that is sufficient to return the pH to values below 8. The thus reinforced piece contains 24% PVA by weight and is identified as "intermediate product D5".

Example 0.6

Flock is made from a bicomponent fibre of the "island-in-the-sea" type, in which the island component is made of PET and the sea component is made of co-PES. The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.202 g/cm$^3$ and unit weight of 603 g/m$^2$.

The felt undergoes dimensional retraction, passing for 5 minutes into an 85° C. solution containing 11.6% PVA with a high saponification value (98%), it is dried in an oven and subjected immediately afterwards to IR radiation for 1 minute, modulating the intensity of the IR lamps in such a manner that the surface temperature of the intermediate product is maintained at 200° C. In these conditions, browning of the intermediate product is much lower than with the same intermediate product in example 0.1, inasmuch it is hardly perceivable.

The subsequent step of removing the sea component from the fibre consists of two steps followed by convective drying: an alkaline treatment by caustic soda at 8% by weight at 65° C. and a cold washing in water that is sufficient to return the pH to values below 8. The thus reinforced piece contains 28% PVA by weight and is identified as "intermediate product D6".

Example 0.7

Flock is made from a bicomponent fibre of the "island-in-the-sea" type, in which the island component is made of Bio-PET and the sea component is made of co-PES of fossil origin.

The Bio-PET has been made by polycondensation of terephthalate acid of fossil origin with ethylene glycol obtained by fermentation. In this polymer the percentage of material from renewable sources is 30% (20% in terms of $^{14}$C content measured according to standard ASTM-D6866-08).

The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.222 g/cm$^3$ and unit weight of 624 g/m$^2$.

The felt undergoes dimensional retraction, going for 5 minutes into an 85° C. solution containing 11.6% PVA with a high saponification value (98%) and is dried in an oven. The subsequent step of removing the sea component from the fibre consists of two steps followed by convective drying: an alkaline treatment by caustic soda at 8% w/w at 45° C. and a cold washing in a saline solution by 1.0% NaCl.

The thus processed piece contains 23% PVA by weight, 8% NaCl by weight and is identified as "intermediate product D7".

Example 0.8

Flock is made from a bicomponent fibre of the "island-in-the-sea" type, in which the island component is made of PET and the sea component is made of co-PES.

In the extrusion step, masterbatch containing carbon black (CB) at 30% by weight in a PET matrix is added to the PET; the carbon black is thus dispersed at 1% by weight in the PET filaments.

The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.189 g/cm$^3$ and unit weight of 592 g/m$^2$.

The felt undergoes dimensional retraction, going for 5 minutes into an 85° C. solution containing 11.6% PVA with a high saponification value (98%) and is dried in an oven. The subsequent step of removing the sea component from the fibre consists of two steps followed by convective drying: an alkaline treatment by caustic soda at 8% w/w at 45° C. and a cold washing in a pH acid solution buffered by an acetic buffer.

The thus processed piece contains 23% PVA by weight, 12% sodium acetate by weight and is identified as "intermediate product D8".

Example 0.9

Flock is made from a bicomponent fibre of the "island-in-the-sea" type, in which the island component is made of PET and the sea component is made of Bio-coPES.

The Bio-coPES has been made by polycondensation of 5-Sulfoisophthalic acid and terephthalic acid synthesised from fossil raw materials with ethylene glycol obtained by fermentation. In this polymer, the percentage of material from renewable sources is 35% (equal to 20% in terms of $^{14}C$ content measured according to standard ASTM-D6866-08).

The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.200 g/cm³ and unit weight of 600 g/m².

The felt undergoes dimensional retraction, passing for 5 minutes into an 85° C. solution containing 11.6% PVA with a high saponification value (98%), it is dried in an oven and subjected immediately afterwards to IR radiation for 1 minute, modulating the intensity of the IR lamps in such a manner that the surface temperature of the intermediate product is maintained at 190° C. In these conditions browning of the intermediate product is much lower than with the same intermediate product in example 0.1, inasmuch it is hardly perceivable.

The subsequent step of removing the sea component from the fibre consists of two steps followed by convective drying: an alkaline treatment by caustic soda at 8% by weight at 65° C. and a cold washing in water that is sufficient to return the pH to values below 8. The thus reinforced piece contains 28% PVA by weight and is identified as "intermediate product D9".

Example 0.10

Flock is made from a bicomponent fibre of the "island-in-the-sea" type, in which the island component is made of Bio-PET and the sea component is made of co-PES of fossil origin.

The Bio-PET has been made by polycondensation of terephthalate acid of fossil origin with ethylene glycol obtained by fermentation. In this polymer the percentage of material from renewable sources is 30% (20% in terms of $^{14}C$ content measured according to standard ASTM-D6866-08).

The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.198 g/cm³ and unit weight of 609 g/m².

The felt undergoes dimensional retraction, passing for 5 minutes into an 85° C. solution containing 11.6% PVA with a high saponification value (98%), it is dried in a first oven and subjected immediately afterwards to IR radiation for 1 minute, modulating the intensity of the IR lamps in such a manner that the surface temperature of the intermediate product is maintained at 200° C. In these conditions browning of the intermediate product is much lower than with the same intermediate product in example 0.1, inasmuch it is hardly perceivable.

The subsequent step of removing the sea component from the fibre consists of two steps followed by convective drying: an alkaline treatment by caustic soda at 8% w/w at 45° C. and a cold washing in water that is sufficient to return the pH to values below 8. The thus reinforced piece contains 23% PVA by weight and is identified as "intermediate product D10".

Example 0.11

Flock is made from a bicomponent fibre of the "island-in-the-sea" type, in which the island component is made of Bio-PET and the sea component is made of co-PES of fossil origin.

The Bio-PET has been made by polycondensation of terephthalate acid of fossil origin with ethylene glycol obtained by fermentation. In this polymer the percentage of material from renewable sources is 30% (20% in terms of $^{14}C$ content measured according to standard ASTM-D6866-08).

The ratio of the island component to the sea component in the fibre is 57:43. The section of the fibre reveals 16 PET microfilaments of circular shape and equal diameter. The flock is obtained by subsequent stretching, crimping and cutting of the continuous island-sea fibre.

The features of the flock are:
denier 4.3 dtex.
length 51 mm
curliness about 4/cm
stretch ratio 2.5:1

The flock that is thus defined is subjected to mechanical needle-punching to make a felt with a density of 0.202 g/cm³ and unit weight of 611 g/m².

The felt undergoes dimensional retraction, going for 5 minutes into an 85° C. solution containing 11.6% PVA with a high saponification value (98%) and is dried in a first oven and is then treated in a second oven at 190° C. for 3 minutes, a sufficient time to permit thermal curing of the PVA, indicated by the amber colouring of the PVA itself. The subsequent step of removing the sea component from the fibre consists of two steps followed by convective drying: an alkaline treatment by caustic soda at 8% by weight at 65° C. and a cold washing in water that is sufficient to return the pH to values below 8. The thus reinforced piece contains 28% PVA by weight and is identified as "intermediate product D11".

EXAMPLES 1. IMPREGNATION

The intermediate products made in examples 0 have been impregnated with an aqueous dispersion containing polyurethane emulsions and other additives such as cross-linker, thickener, salts and various fillers, each in the weight ratios as shown in Table 1.

Specifically, the products used to make an aqueous dispersion are:
Polyurethane 1: Aliphatic PUD, anionic character, polyether/polycarbonate base. Water content 39%.
Polyurethane 2: Type 1 BIO-PUD (aliphatic PUD, anionic character, polyether/polycarbonate base) the polycarbonate fraction of which contains 22% renewable sources, (in terms of $^{14}$C content measured according to standard ASTM-D6866-08). Water content 41%.

Polyurethane 3: Aliphatic PUD, anionic character, polyether base. Water content 40%.

Polyurethane 4: Aliphatic Bio-PUD, anionic character, polyester base, 45% of the carbon of which comes from renewable sources (in terms of $^{14}$C content measured according to standard ASTM-D6866-08). Water content 56%.

Polyurethane 5: Aliphatic PUD, anionic character, polycarbonate base. Water content 40%.

Cross-linker 1: blocked aliphatic polyisocyanate dispersed in water, with deblocking temperature from 120° C. and 55% water content.

Cross-linker 2: multifunctional polycarbodiimide dispersed in water with 61% water content.

Thickener 1: associative thickener of polyurethane type, the active ingredient of which is equal to 20% of its weight (dry residue 33%).

Thickener 2: polymeric thickener of carboxymethylcellulose type in powder form.

Thickener 3: rheological modifier of the xanthan gum in powder form.

Thickener 4: acrylic thickener with active ingredient at 10% by weight thereof.

Filler 1: polyvinyl alcohol solution the viscosity of which is <100 cPs at 20° C. with low shear stress values.

Filler 2: co-PES water dispersible solution.

Filler 3: ammonium bicarbonate solution.

Filler 4: hydrophilic emulsion of modified polysiloxane, self-emulsifying.

Downstream of the impregnation with the selected formulation, the wet intermediate product is dried and then taken to 150° C. with the technologies disclosed in Table 1. Each piece is then subjected to washing in hot water and drying, thus generating the nth intermediate product identified as "intermediate product IE n", where "n" is a number indicated in Table 1. The waste fluid generated in the washing step contains PVA that can be processed for recovery.

Example 1.01

An aqueous dispersion is prepared containing a mixture of type 2 and 3 pure polyurethanes in a ratio of 3:1, of type 1 cross-linker and of type 1 thickener in order to reach 600 mPa·s viscosity at 20° C. in the application conditions.

The previously defined intermediate product D1 is impregnated by dipping with this dispersion that is twice the weight thereof and immediately heat-treated in a convection oven in order to fix the suspended particles, remove the residual water and volatile substances and activate the cross-linker.

The piece is then washed at atmospheric pressure to remove the PVA with softened water (devoid of alkaline earth salts) at a temperature near boiling point and is then dried again.

The intermediate product, which contains 33% polyurethane and is identified as "intermediate product IE 1", undergoes subsequent mechanical splitting and buffing before being subjected to the acid dyeing process according to the prior art.

Example 1.02

An aqueous dispersion is prepared containing a mixture of type 1 and 3 polyurethanes in a ratio of 3:1, of type 1 cross-linker and of type 1 filler in order to reach 450 mPa·s viscosity at 20° C. in the application conditions.

The previously defined intermediate product D1 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point with the help of a dispersing agent for PVA as described in the prior art and is then dried again.

The intermediate product, which contains 32% polyurethane and is identified as "intermediate product IE 2", undergoes subsequent mechanical splitting and buffing before being subjected to the acid dyeing process according to the prior art.

Example 1.03

An aqueous dispersion is prepared containing a type 1 polyurethane, type 1 cross-linker, type 3 thickener and type 1 filler in order to reach 662 mPa·s viscosity at 20° C. in the application conditions.

The previously defined intermediate product D1 is impregnated by dipping with this dispersion that is twice the weight thereof and immediately heat-treated in a convection oven in order to fix the suspended particles, remove the residual water and volatile substances and activate the cross-linker.

The piece is then washed at atmospheric pressure to remove the PVA with softened water at a temperature near boiling point and is then dried again.

The intermediate product, which contains 25% polyurethane and is identified as "intermediate product IE 3", undergoes subsequent mechanical splitting and buffing before being subjected to the acid dyeing process according to the prior art.

Example 1.04

An aqueous dispersion is prepared containing a type 1 polyurethane, type 1 cross-linker and type 1 thickener in order to reach 560 mPa·s viscosity at 20° C. in the application conditions.

The previously defined intermediate product D1 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point and is then dried again.

The intermediate product, which contains 25% polyurethane and is identified as "intermediate product IE 4", undergoes subsequent mechanical splitting and buffing before being subjected to the acid dyeing process according to the prior art.

Example 1.05

An aqueous dispersion is prepared containing a type 1 polyurethane, type 1 cross-linker, type 1 thickener and type 2 filler in order to reach 560 mPa·s viscosity at 20° C. in the application conditions.

The previously defined intermediate product D1 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point and is then dried again.

The intermediate product, which contains 33% polyurethane and is identified as "intermediate product IE 5", undergoes subsequent mechanical splitting and buffing before being subjected to the acid dyeing process according to the prior art.

Example 1.06

An aqueous dispersion is prepared containing a type 1 polyurethane, type 1 cross-linker and type 1 thickener in order to reach 560 mPa·s viscosity at 20° C. in the application conditions.

The previously defined intermediate product D1 is impregnated by dipping with this dispersion that is twice the weight thereof, subjected to a pretreatment step with radiofrequencies until half the water content is removed (50 seconds in the oven with a parallel field in which 0.5 KV voltage is applied), then subsequently heat-treated in a convection oven in order to fix the suspended particles, remove the residual water and volatile substances and activate the cross-linker.

The piece is then washed at atmospheric pressure to remove the PVA with softened water at a temperature near boiling point and is then dried again.

The intermediate product, which contains 34% polyurethane and is identified as "intermediate product IE 6", undergoes subsequent mechanical splitting and buffing before being subjected to the acid dyeing process according to the prior art.

Example 1.07

An aqueous dispersion is prepared containing a type 3 polyurethane, type 2 cross-linker and type 1 thickener in order to reach 499 mPa·s viscosity at 20° C. in the application conditions.

The previously defined intermediate product D1 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 28% polyurethane and is identified as "intermediate product IE 7", undergoes subsequent mechanical splitting and buffing before being subjected to the acid dyeing process according to the prior art.

Example 1.08

An aqueous dispersion is prepared containing a mixture of type 1 and 3 pure polyurethanes in a ratio of 3:1, of type 1 cross-linker and of type 2 thickener in order to reach 790 mPa·s viscosity at 20° C. in the application conditions.

The previously defined intermediate product D1 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 32% polyurethane and is identified as "intermediate product IE 8", undergoes subsequent mechanical splitting and buffing before being subjected to the acid dyeing process according to the prior art.

Example 1.09

An aqueous dispersion is prepared containing a type 2 polyurethane, type 1 cross-linker and type 1 thickener in order to reach 560 mPa·s viscosity at 20° C. in the application conditions.

The previously defined intermediate product D2 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point and is then dried again.

The intermediate product, which contains 33% polyurethane and is identified as "intermediate product IE 9", undergoes subsequent mechanical splitting and buffing before being subjected to the dyeing process at pH 9.4 through the addition of sodium acetate.

Example 1.10

An aqueous dispersion is prepared containing a type 2 polyurethane, type 1 cross-linker and type 1 thickener in order to reach 560 mPa·s viscosity at 20° C. in the application conditions.

The previously defined intermediate product D2 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 32% polyurethane and is identified as "intermediate product IE 10", undergoes subsequent mechanical splitting and buffing before being subjected to the acid dyeing process according to the prior art.

Example 1.11

An aqueous dispersion is prepared containing a mixture of type 2 and 3 pure polyurethanes in a ratio of 3:1, of type 1 cross-linker and of type 1 thickener in order to reach 600 mPa·s viscosity at 20° C. in the application conditions.

The previously defined intermediate product D3 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 32% polyurethane and is identified as "intermediate product IE 11", undergoes subsequent mechanical splitting and buffing before being subjected to the acid dyeing process according to the prior art.

Example 1.12

An aqueous dispersion is prepared containing a type 1 polyurethane, type 1 cross-linker and type 1 thickener in order to reach 560 mPa·s viscosity at 20° C. in the application conditions.

The previously defined intermediate product D4 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 32% polyurethane and is identified as "intermediate product IE 12", undergoes subsequent mechanical splitting and buffing before being subjected to the acid dyeing process according to the prior art.

Example 1.13

An aqueous dispersion is prepared containing a type 1 polyurethane, type 1 cross-linker, type 1 thickener and type 3 filler in order to reach 555 mPa·s viscosity at 20° C. in the application conditions.

The previously defined intermediate product D4 is impregnated by dipping with this dispersion that is twice the weight thereof and immediately heat-treated in a convection oven first at a low temperature (from 60° C. to 75° C. during the time in the oven) in order to break down the ammonium salt thermally, and subsequently at a higher temperature in order to fix the suspended particles, remove the water and volatile substances and activate the cross-linker.

The piece is then washed at atmospheric pressure to remove the PVA with softened water at a temperature near boiling point and is then dried again.

Figure 4A:
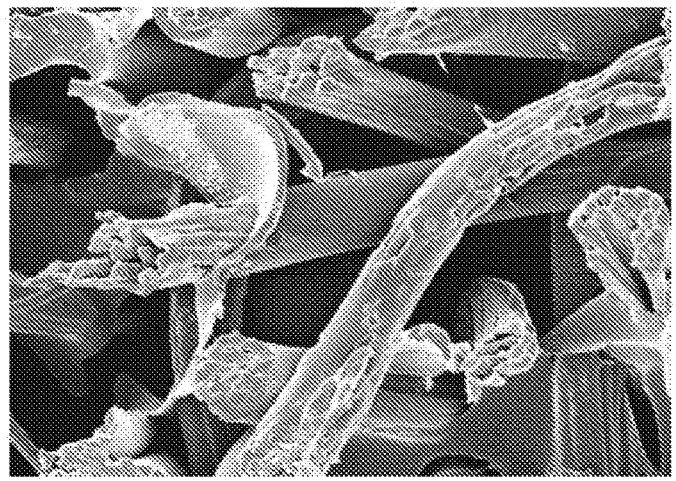
FIG. 4A shows a microfibrous intermediate product impregnated with a preparation of polyurethane dispersed in water and deprived of the PVA (step h)) that differs from the preceding ones by the fact that an additive was used that is able to generate gaseous decomposition products during the coagulation/drying step (step g)).

The intermediate product, which contains 34% polyurethane and is identified as "intermediate product IE 13", undergoes subsequent mechanical splitting and buffing before being subjected to the acid dyeing process according to the prior art. Adding the type 3 additive causes a polyurethane structure to be formed that is not completely homogeneous, which leaves the microfibres partially free, as it is possible to observe in the SEM image of FIG. 4A.

Example 1.14

An aqueous dispersion is prepared containing a mixture of type 1 and 3 polyurethanes in a ratio of 4:1, of type 1 cross-linker and of type 1 filler in order to reach 450 mPa·s viscosity at 20° C. in the application conditions.

The previously defined intermediate product D5 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point with the help of a dispersing agent for PVA as described in the prior art and is then dried again.

The intermediate product, which contains 32% polyurethane and is identified as "intermediate product IE 14", undergoes subsequent mechanical splitting and buffing before being subjected to the acid dyeing process according to the prior art.

Example 1.15

An aqueous dispersion is prepared containing a type 1 polyurethane, type 1 cross-linker and type 1 thickener in order to reach 560 mPa·s viscosity at 20° C. in the application conditions.

The previously defined intermediate product D5 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point and is then dried again.

The intermediate product, which contains 34% polyurethane and is identified as "intermediate product IE 15", undergoes subsequent mechanical splitting and buffing before being subjected to the acid dyeing process according to the prior art.

Example 1.16

An aqueous dispersion is prepared containing a type 4 polyurethane, type 2 cross-linker and type 1 thickener in order to reach 775 mPa·s viscosity at 20° C. in the application conditions.

The previously defined intermediate product D5 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 30% polyurethane and is identified as "intermediate product IE 16", undergoes subsequent mechanical splitting and buffing before being subjected to the acid dyeing process according to the prior art.

Example 1.17

An aqueous dispersion is prepared containing a mixture of type 1 and 3 polyurethanes in a ratio of 4:1, of type 1 cross-linker and of type 1 filler in order to reach 450 mPa·s viscosity at 20° C. in the application conditions.

The previously defined intermediate product D6 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point with the help of a dispersing agent for PVA as described in the prior art and is then dried again.

The intermediate product, which contains 33% polyurethane and is identified as "intermediate product IE 17", undergoes subsequent splitting and buffing before being subjected to the dyeing process at pH 9.4 through the addition of sodium acetate.

Example 1.18

An aqueous dispersion is prepared containing a type 3 polyurethane, type 1 cross-linker, type 1 thickener and type 4 filler in order to reach 354 mPa·s viscosity at 20° C. in the application conditions.

The previously defined intermediate product D6 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 29% polyurethane and is identified as "intermediate product IE 18", undergoes subsequent mechanical splitting and buffing before being subjected to the acid dyeing process according to the prior art.

Example 1.19

An aqueous dispersion is prepared containing a type 1 polyurethane, type 1 cross-linker and type 1 thickener in order to reach 560 mPa·s viscosity at 20° C. in the application conditions.

The previously defined intermediate product D7 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with softened water at a temperature near boiling point and is then dried again.

The intermediate product, which contains 35% polyurethane and is identified as "intermediate product IE 19", undergoes subsequent mechanical splitting and buffing before being subjected to the acid dyeing process according to the prior art.

Example 1.20

An aqueous dispersion is prepared containing a mixture of type 1 and 3 polyurethanes in a ratio of 4:1, of type 1 cross-linker and of type 1 filler in order to reach 450 mPa·s viscosity at 20° C. in the application conditions.

The previously defined intermediate product D8 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point with the help of a dispersing agent for PVA as described in the prior art and is then dried again.

The intermediate product, which contains 33% polyurethane and is identified as "intermediate product IE 20", undergoes subsequent mechanical splitting and buffing before being subjected to the acid dyeing process according to the prior art.

Example 1.21

An aqueous dispersion is prepared containing a type 1 polyurethane, type 1 cross-linker and type 1 thickener in order to reach 560 mPa·s viscosity at 20° C. in the application conditions.

The previously defined intermediate product D9 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point and is then dried again.

The intermediate product, which contains 33% polyurethane and is identified as "intermediate product IE 21", undergoes subsequent mechanical splitting and buffing before being subjected to the acid dyeing process according to the prior art.

Example 1.22

An aqueous dispersion is prepared containing a mixture of type 1 and 3 polyurethanes in a ratio of 4:1, of type 1 cross-linker and of type 1 filler in order to reach 450 mPa·s viscosity at 20° C. in the application conditions.

The previously defined intermediate product D9 is impregnated by dipping with this dispersion that is twice the weight thereof, subjected to a pretreatment step with infrared radiation in the 2 to 10 micron range, then subsequently heat-treated in a convection oven in order to fix the suspended particles, remove the residual water and volatile substances and activate the cross-linker.

The piece is then washed at atmospheric pressure to remove the PVA with softened water at a temperature near boiling point with the help of a dispersing agent for PVA as described in the prior art and is then dried again.

The intermediate product, which contains 33% polyurethane and is identified as "intermediate product IE 22", undergoes subsequent mechanical splitting and buffing before being subjected to the acid dyeing process according to the prior art.

Example 1.23

An aqueous dispersion is prepared containing a mixture of type 1 and 3 polyurethanes in a ratio of 4:1, of type 1 cross-linker and of type 1 filler in order to reach 450 mPa·s viscosity at 20° C. in the application conditions.

The previously defined intermediate product D9 is impregnated by dipping with this dispersion that is twice the weight thereof and immediately heat-treated in a convection oven in order to fix the suspended particles, remove the residual water and volatile substances and activate the cross-linker.

The piece is then washed at atmospheric pressure to remove the PVA with softened water at a temperature near boiling point with the help of a dispersing agent for PVA as described in the prior art and is then dried again.

The intermediate product, which contains 32% polyurethane and is identified as "intermediate product IE 23", undergoes subsequent mechanical splitting and buffing before being subjected to the acid dyeing process according to the prior art.

Example 1.24

An aqueous dispersion is prepared containing a type 1 polyurethane, type 1 cross-linker, type 1 thickener and type 4 filler in order to reach 555 mPa·s viscosity at 20° C. in the application conditions.

The previously defined intermediate product D10 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with water devoid of alkaline earth salts at a temperature near boiling point and is then dried again.

The intermediate product, which contains 33% polyurethane and is identified as "intermediate product IE 24", undergoes subsequent mechanical splitting and buffing before being subjected to the acid dyeing process according to the prior art.

Example 1.25

An aqueous dispersion is prepared containing a type 1 polyurethane, type 1 cross-linker and type 1 thickener in order to reach 485 mPa·s viscosity at 20° C. in the application conditions.

The previously defined intermediate product D1 is impregnated by dipping with this dispersion that is twice the weight thereof and immediately heat-treated in a convection oven in order to fix the suspended particles, remove the water and volatile substances and activate the cross-linker.

The piece is then washed at atmospheric pressure to remove the PVA with water devoid of alkaline earth salts at a temperature near boiling point and is then dried again.

The intermediate product, which contains 35% polyurethane and is identified as "intermediate product IE 25", undergoes subsequent mechanical splitting and buffing before being subjected to the acid dyeing process according to the prior art.

Example 1.26

An aqueous dispersion is prepared containing a type 1 polyurethane, type 1 cross-linker and type 1 thickener in order to reach 601 mPa·s viscosity at 20° C. in the application conditions.

The previously defined intermediate product D11 is impregnated by dipping with this dispersion that is twice the weight thereof and immediately heat-treated in a convection oven in order to fix the suspended particles, remove the residual water and volatile substances and activate the cross-linker.

The piece is then washed at atmospheric pressure to remove the PVA with water devoid of alkaline earth salts at a temperature near boiling point and is then dried again.

The intermediate product, which contains 33% polyurethane and is identified as "intermediate product IE 26", undergoes subsequent mechanical splitting and buffing before being subjected to the acid dyeing process according to the prior art.

Example 1.27

The "intermediate product IE 25" is made as disclosed in example 1.25, which undergoes the same mechanical processes.

Unlike this, dyeing occurs at pH 9.4 through the addition of sodium acetate.

The intermediate product contains 35% polyurethane and is identified as "intermediate product IE 27".

Example 1.28

An aqueous dispersion is prepared containing a type 5 polyurethane, type 1 cross-linker and type 1 thickener in order to reach 654 mPa·s viscosity at 20° C. in the application conditions.

The previously defined intermediate product D1 is impregnated by dipping with this dispersion that is twice the weight thereof, immersed in a coagulating solution consisting of a 5% acetic acid aqueous solution at 50° C. for 10 minutes, then subsequently heat-treated in a convection oven in order to fix the particles of coagulated polyurethane, remove the residual water and volatile substances and activate the cross-linker.

The piece is then washed at atmospheric pressure to remove the PVA with softened water at a temperature near boiling point and is then dried again.

The intermediate product, which contains 33% polyurethane and is identified as "intermediate product IE 28", undergoes subsequent mechanical splitting and buffing before being subjected to the acid dyeing process according to the prior art.

Example 1.29

An aqueous dispersion is prepared containing a type 3 polyurethane, type 2 cross-linker, and a mixture of type 1 and type 4 thickeners in a 1:1 ratio in order to reach 3433 mPa·s viscosity at 3.58 s$^{-1}$ at 20° C.

The previously defined intermediate product D4 is impregnated by dipping with this dispersion that is twice the weight thereof, immersed in a coagulating solution consisting of a 0.25% formic acid aqueous solution in hot water at 60° C. for 15 minutes, then subsequently heat-treated in a convection oven in order to fix the particles of coagulated polyurethane, remove the residual water and volatile substances and activate the cross-linker.

The piece is then washed at atmospheric pressure to remove the PVA with softened water at a temperature near boiling point and is then dried again.

The intermediate product, which contains 33% polyurethane and is identified as "intermediate product IE 29", undergoes subsequent splitting and buffing before being subjected to the acid dyeing process according to the prior art.

Example 1.30

An aqueous dispersion is prepared containing a type 4 polyurethane, type 1 cross-linker, and a mixture of type 1 and type 4 thickeners in a 1:4 ratio in order to reach 768 mPa·s viscosity at 3.58 s−1 at 20° C.

The previously defined intermediate product D1 is impregnated by dipping with this dispersion that is twice the weight thereof, immersed in a coagulating solution consisting of a 0.5% formic acid aqueous solution in hot water at 60° C. for 7 minutes, then subsequently heat-treated in a convection oven in order to fix the particles of coagulated polyurethane, remove the residual water and volatile substances and activate the cross-linker.

The piece is then washed at atmospheric pressure to remove the PVA with softened water at a temperature near boiling point and is then dried again.

The intermediate product, which contains 29% polyurethane and is identified as "intermediate product IE 30", undergoes subsequent mechanical splitting and buffing before being subjected to the acid dyeing process according to the prior art.

The intermediate products made, after dyeing in industrial jet with acid pH according to the prior art for polyester-based fibres or with basic pH by adding sodium salts of weak acids, have then been subjected to characterisation to assess the appearance, hand, resistance to abrasion and durability thereof. The sensory evaluations of hand, appearance and touch are conducted to compare the reference products obtained with the solvent process. The hand is evaluated by judging the parameters of softness and of gum-up (elastic and resilience recovery); for the appearance evaluation, the uniformity of the nap and the surface feel are evaluated.

All the sensory evaluations are expressed by numeric values from 1 to 5, where 1 is the minimum, 5 is the maximum and 3 is a still acceptable value.

Resistance to abrasion is evaluated by measuring loss of weight and/or appearance changes. In particular, the following is evaluated:
  the formation of pilling (formation of a surface layer of fuzz that then becomes entangled and forms actual balls of fibre; the phenomenon is above all noticeable in garments made from natural fibres like wool), by visual comparison with 5 standard samples, after the material has been subjected to an abrasion test with the Martindale abrasion tester (EN ISO 12947) for 2,000 cycles, 5,000 cycles, 10,000 cycles and 20,000 cycles, at 12 kPa pressure
  the presence of nap cutting phenomena, linked to the loss of nap from the surface during the abrasion test with the Martindale abrasion tester (EN ISO 12947) after 2,000 cycles, 5,000 cycles, 10,000 cycles and 20,000 cycles, at 12 kPa pressure; the evaluation is qualitative and is based on the estimate of the portion of abraded surface devoid of fibre. An evaluation score of 5 is given when the surface without fibre is less than 10% of the surface subjected to abrasion, 4 corresponds to a surface devoid of nap comprised between 10% and 20% of the total surface, 3 is given when the surface devoid of nap is comprised between 20% and 30%, 2 when it is comprised between 30% and 40%, 1 when the surface devoid of nap is greater than 40% of the surface subjected to abrasion.

These phenomena are generally influenced by the adhesion between polyurethane and fibre: when adhesion is high, there are no pilling phenomena but nap cutting phenomena may appear that are linked to the fact that if the fibre cannot move properly during the abrasion test it may end up splitting; on the other hand, when the polyurethane does not bind the fibre well, pilling may form whereas nap cutting phenomena are generally absent.

"Durability" is defined as the resistance of dyed material to abrasion over time, also following prolonged and repeated exposure to light and to highly hydrolysing environments. The ageing tests used for measuring "durability" are:
  1. U.V. ray ageing, conducted with Xenotest BETA equipment in the following conditions: relative humidity, 20±10%; black panel temperature, 100±3° C.; radiation power, 60 W/m$^2$; exposure time, 190 h (standard PV1303).
  2. Hydrolysis resistance (known briefly as "Jungle Test") conducted with an environmental chamber in the following conditions: relative humidity, 90±3%; temperature, 75±1° C.; exposure time 5-7-10 weeks.

Durability, after the ageing tests, is always evaluated in terms of appearance changes. In particular, the following is evaluated:
  the formation of pilling, by visual comparison with 5 standard samples, after the material has been subjected to an abrasion test with the Martindale abrasion tester (EN ISO 12947) for 20,000 cycles, at 12 kPa pressure.
  the presence of nap cutting phenomena.

The evaluation scales are those disclosed previously.

The prototypes made according to the previously illustrated examples, once they have been subjected to dyeing in industrial jet, have been evaluated obtaining the results summarised in Table 2; in the same table the evaluation of the prototypes made according to patent EP1323859 (solvent process, prototype A) and the examples 2.2 (prototype B) and 1.1b (prototype C) disclosed in patent EP2780501 are shown by way of comparison.

The evaluations of Table 2 show how applying IR technology to pretreat polyurethane and vary the solubility of the PVA entails improvements in both the physical/mechanical and aesthetic properties; in addition, the greater stiffness for the same polyurethane content in the intermediate product treated with this technology is addressed by the lowering of the necessary polyurethane percentage, with a significant advantage in terms of appearance, manufacturing costs and connected environmental impact.

Applying a filler such as PVA, results in improved softness and pleasantness to the touch but to the detriment of resilience and surface appearance, which is poorer. The gap can be partially recouped by applying IR technology.

Also the addition of monovalent salts before impregnation with the polyurethane (in the PVA or in the intermediate product produced in step e) of the process), enables the distribution of the PUD in the piece to be modulated with positive effects on the physical/mechanical properties and on the appearance, to the detriment of softness for the same PUD content. With some polyurethane formulations, the dyeing pH (acid or basic) can influence the appearance and physical/mechanical properties of the compound.

Figure 4B:
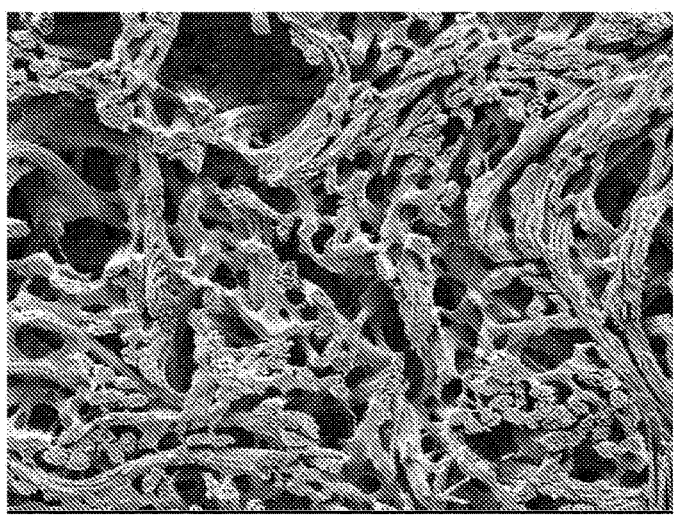
FIG. 4B shows a microfibrous intermediate product impregnated with a preparation of polyurethane dispersed in water and subjected to coagulation in an aqueous solution of formic acid and subsequent drying (step g)), followed by the step of removing the PVA (step h)). The porous structure should be noted which is generated by the process of coagulation in water containing formic acid and the limited adhesion between the polyurethane and the microfibre that ensures greater softness and elasticity in the end product.
Figure 5A:
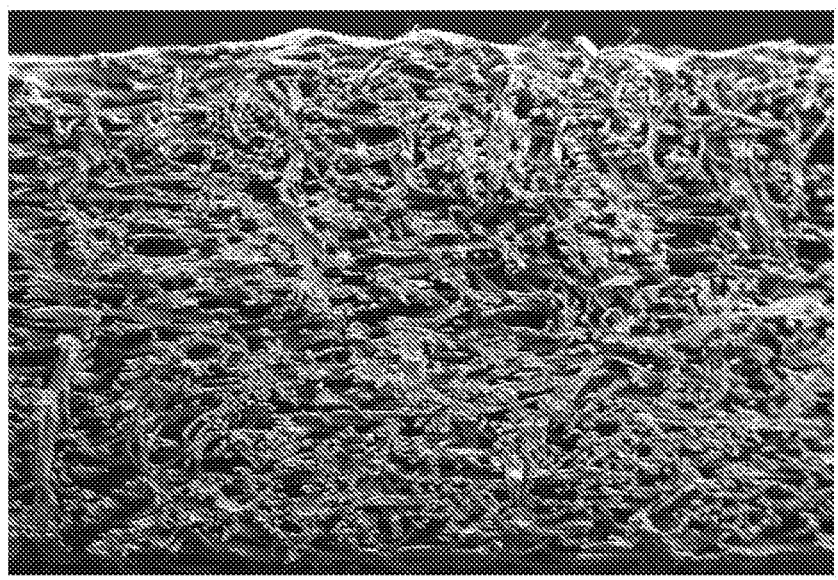
FIG. 5A shows a microfibrous intermediate product impregnated with a preparation of polyurethane dispersed in water and directly subjected to coagulation/drying (step g)).
Figure 5B:
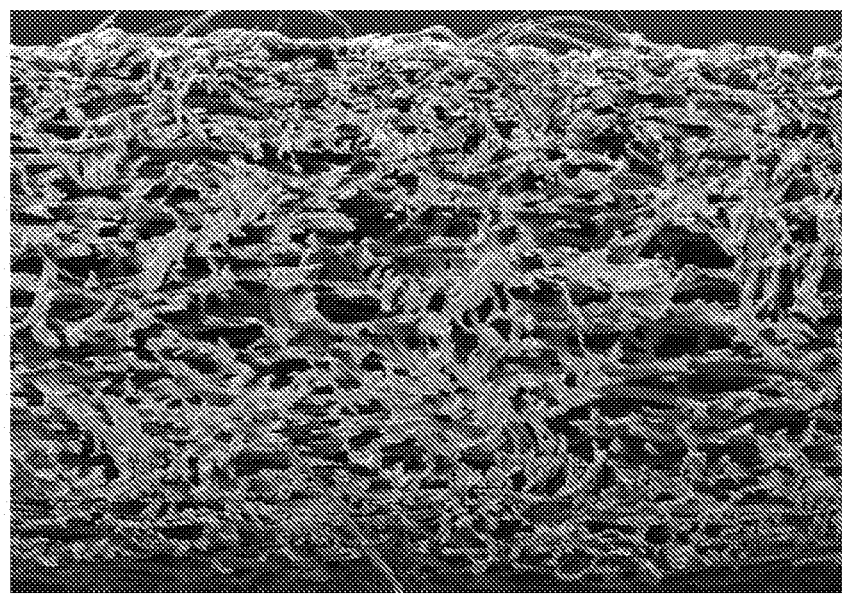
FIG. 5B shows a microfibrous intermediate product impregnated with a preparation of polyurethane dispersed in water, subjected to pretreatment with IR lamps before the coagulation/drying process (step g)). After depriving the intermediate products of PVA (step h)), a greater concentration of polyurethane is noted in the centre of the intermediate product 5B with respect to the intermediate product 5A; this leaves the surface freer, with an overall improvement of the appearance of the end product.

Using the process of coagulation in an aqueous solution of salts or acids enables a porous polyurethane structure to be obtained that, in addition to giving a soft product with a hand and appearance that are similar to the products obtained with the solvent process, also enables a porous polyurethane structure to be generated that is similar to the structure that is obtainable with the solvent process (see FIG. 4B).

The combination of the new technologies disclosed above enables the final properties of the compound to be directed towards the desired analytical and sensory features.

Figure 6:
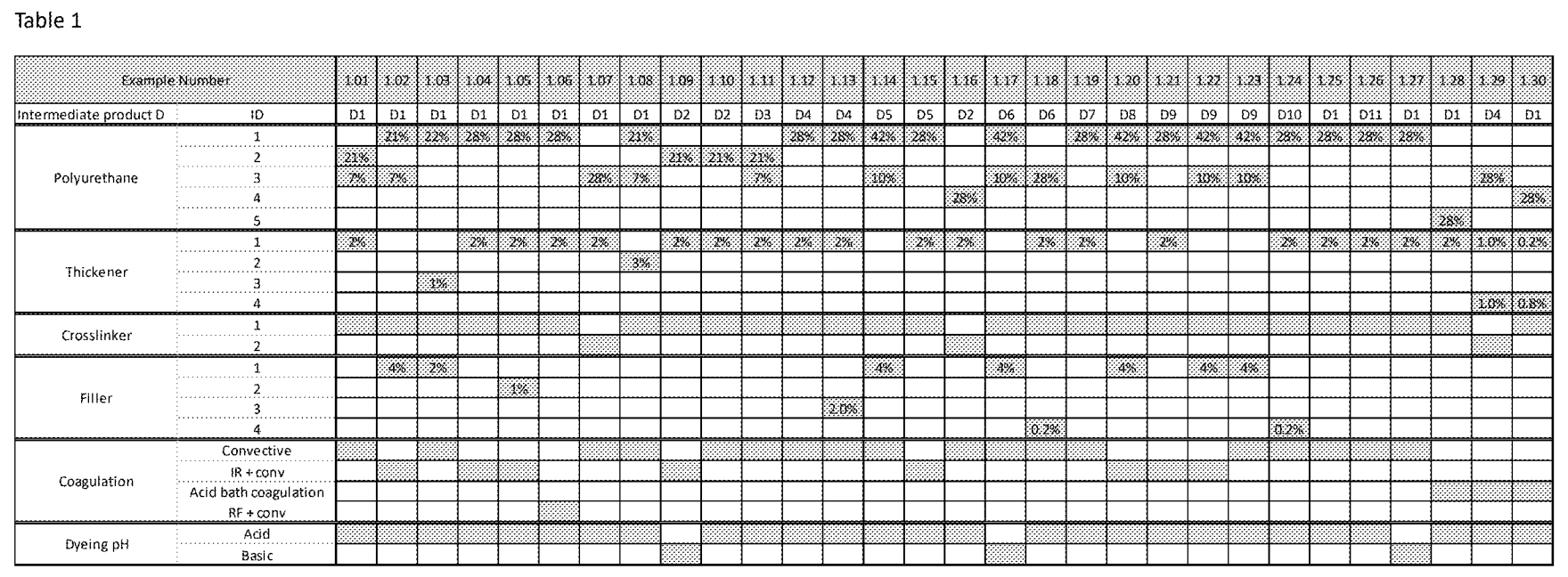

In particular, as can be noted from the data shown in FIG. 6, Table 1, the prototypes made with the process according to the present invention (IE01-IE30) have been compared with the prototypes B and C made with a similar process disclosed in patent EP2780501; i.e. a process that does not require the use of organic solvents but does not involve the washing step (step e)) of the microfibrous intermediate product. It is possible to note how, for the prototypes of the present invention, the sensory evaluations of hand, softness and appearance are clearly superior to those obtained for B and C prototypes, approaching or even equaling those carried out on the reference prototype A obtained with the current solvent process disclosed in patent EP1323859.

On 30 prototypes made by the process of the present invention, 83% (i.e. 25 prototypes) shows a better appearance (sensory evaluation score equal to 4 or 5 out of a maximum of 5) than that of the prototypes B and C (sensory evaluation score of 2 and 3 respectively), approaching or even equaling the desired appearance (5 out of 5) that is obtainable with the solvent process.

The hand and softness evaluation scores of the IE01-IE30 prototypes were also better than those of B and C. In particular, 63% (i.e. 19 prototypes) of the tested prototypes of the present invention has greater softness and 53% (i.e. 16 prototypes) is provided with a better hand (sensory evaluation score equal to 4 or 5 out of a maximum of 5) than the prototypes B and C (sensory evaluation score equal to 3), approaching or even equaling, also in this case, softness and hand of the solvent process (sensory evaluation 5 out of 5).

In the light of the comparative experiments disclosed above, it is clear that with the process according to the present invention it is possible to obtain a finished product that is achievable with methods with a low environmental impact or which are eco-compatible that is at the same time able to maintain the hand, softness, elasticity and appearance features desired that are typical of products obtained with the current organic solvent process.

The invention claimed is:

1. A process for the preparation of a microfibrous nonwoven fabric, comprising the steps of:
    a) preparing a bicomponent fibre of an island-sea type, in which the sea component is a polymer that is removable in hot water or in an aqueous alkaline solution;
    b) preparing a felt by needle-punching the bicomponent fibre of the island-sea type;
    c) performing hot impregnation of said felt with an aqueous solution of polyvinyl alcohol (PVA) having a degree of saponification of at least 94%;
    d) removing the sea component from the felt impregnated with PVA as obtained in step c), by contact the felt with an aqueous basic solution of an alkaline or alkaline earth hydroxide, thereby obtaining a microfibrous intermediate product;
    e) adding neutral water containing a water-soluble organic or inorganic salt to the microfibrous intermediate product of step d), leaving a layer of salt on a surface of said microfibrous intermediate product;
    f) performing cold impregnation of the microfibrous intermediate product specified in step e) with polyurethane (PU) dispersed in water containing additives for adjusting viscosity;
    g) fixing the PU to the microfibrous intermediate product by means of coagulation of the PU dispersion and subsequent drying;
    h) removing the PVA added at step c), the salt added at step e) and the additives added at step f); and
    i) subjecting the material thus obtained in step h) to cutting, buffing, on one or both sides, and dyeing.

2. A process for the preparation of a microfibrous nonwoven fabric, comprising the steps of:
    a) preparing a bicomponent fibre of an island-sea type, in which the sea component is a polymer that is removable in hot water or in an aqueous alkaline solution;
    b) preparing a felt by needle-punching the bicomponent fibre of the island-sea type;
    c) performing hot impregnation of said felt with an aqueous solution of polyvinyl alcohol (PVA) having a degree of saponification of at least 94%;
    d) removing the sea component from the felt impregnated with PVA as obtained in step c), by contact of the felt with an aqueous basic solution of an alkaline or alkaline earth hydroxide, thereby obtaining a microfibrous intermediate product;
    e) adding to the microfibrous intermediate product of step d) acidic water which reacts with the alkaline or alkaline earth hydroxide of the d) to form a layer of salt near a surface of said microfibrous intermediate product;
    f) leaving said layer of salt on a surface of said microfibrous intermediate product;
    g) performing cold impregnation of the microfibrous intermediate product specified in step e) with a polyurethane (PU) dispersed in water containing additives for adjusting viscosity, wherein said layer of salt near the surface enables the distribution of PU;
    h) fixing the PU to the microfibrous intermediate product by means of coagulation of the PU dispersion and subsequent drying;
    i) removing the PVA added at step c), the salt formed at step e) and the additive added at step g); and
    j) subjecting the material thus obtained in step i) to cutting, buffing, on one or both sides, and dyeing.

3. The process according to claim 2, wherein following step c), the felt impregnated with PVA is subjected to drying and then to a heat or radiation treatment at a temperature of at least 100° C.

4. The process according to claim 2, wherein in step d) the aqueous basic solution of an alkaline or alkaline earth hydroxide is a solution of NaOH or KOH.

5. The process according to claim 2, wherein the concentration of alkaline or alkaline earth hydroxide is within the range of 0.1% to 48% by weight.

6. The process according to claim 2, wherein the viscosity of the dispersion in PU in water of step f) is in the range of 200 to 80 mPa·s at 20° C.

7. The process according to claim 2, wherein the fixing of the PU in step g) takes place through hot air coagulation, hot water coagulation, coagulation in an aqueous solution of acid electrolytes, radiofrequency coagulation, microwave coagulation, ultrasound coagulation, infrared (IR) radiation coagulation or steam coagulation.

8. The process according to claim 2, wherein the fixing process specified in step g) is preceded by radiation with IR lamps or radiofrequencies or microwaves so as to preheat the PU dispersed in water rapidly.

9. The process according to claim 2, wherein following step c), the felt impregnated with PVA is subjected to drying and then to a heat or radiation treatment at a temperature within the range of 140° C. to 250° C.

10. The process according to claim 2, wherein the concentration of alkaline or alkaline earth hydroxide is within the range of 5% to 12% by weight.

* * * * *